(12) United States Patent
Matz

(10) Patent No.: US 8,935,722 B2
(45) Date of Patent: *Jan. 13, 2015

(54) METHODS, SYSTEMS, AND PRODUCTS FOR CONTENT BLOCKING

(75) Inventor: William R. Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,294

(22) Filed: Feb. 3, 2012

(65) Prior Publication Data

US 2012/0136965 A1     May 31, 2012

Related U.S. Application Data

(63) Continuation of application No. 12/869,792, filed on Aug. 27, 2010, now Pat. No. 8,136,135, which is a continuation of application No. 10/176,939, filed on Jun. 20, 2002, now Pat. No. 7,818,764.

(51) Int. Cl.

| | |
|---|---|
| *H04N 7/10* | (2006.01) |
| *H04N 7/025* | (2006.01) |
| *H04N 21/266* | (2011.01) |
| *H04N 7/16* | (2011.01) |
| *H04N 21/44* | (2011.01) |
| *H04N 21/442* | (2011.01) |
| *H04N 21/45* | (2011.01) |
| *H04N 21/454* | (2011.01) |
| *H04N 21/488* | (2011.01) |
| *H04N 21/81* | (2011.01) |
| *H04N 21/84* | (2011.01) |

(52) U.S. Cl.
CPC ......... *H04N 21/26603* (2013.01); *H04N 7/163* (2013.01); *H04N 21/44016* (2013.01); *H04N 21/44222* (2013.01); *H04N 21/4532* (2013.01); *H04N 21/4542* (2013.01); *H04N 21/4882* (2013.01); *H04N 21/812* (2013.01); *H04N 21/84* (2013.01)
USPC .......................................................... 725/34

(58) Field of Classification Search
None
See application file for complete search history.

(56) References Cited

U.S. PATENT DOCUMENTS

| | | | |
|---|---|---|---|
| 5,038,211 A | | 8/1991 | Hallenbeck |
| 5,155,591 A | | 10/1992 | Wachob |
| 5,260,778 A | | 11/1993 | Kauffman et al. |
| 5,559,548 A | | 9/1996 | Davis et al. |
| 5,630,119 A | | 5/1997 | Aristides et al. |
| 5,664,046 A | * | 9/1997 | Abecassis ...................... 386/206 |

(Continued)

FOREIGN PATENT DOCUMENTS

| | | |
|---|---|---|
| EP | 1026886 | 8/2000 |
| GB | 2267768 | 12/1993 |

OTHER PUBLICATIONS

"The Wink System,", www.wink.com, date unknown, 5 pages.

(Continued)

*Primary Examiner* — Brian T Pendleton
*Assistant Examiner* — Jonathan V Lewis
(74) *Attorney, Agent, or Firm* — Scott P. Zimmerman, PLLC

(57) ABSTRACT

Methods, systems, and products block objectionable content and substitute alternative content. A preferred tag is retrieved from memory. An alternative tag, associated with alternative content, is also retrieved from the memory. When the preferred tag matches the alternative tag, then the alternative content is substituted for the objectionable content.

20 Claims, 22 Drawing Sheets

(56) References Cited

U.S. PATENT DOCUMENTS

| | | | |
|---|---|---|---|
| 5,799,273 A * | 8/1998 | Mitchell et al. | 704/235 |
| 5,818,438 A | 10/1998 | Howe et al. | |
| 5,825,407 A | 10/1998 | Cowe et al. | |
| 5,833,470 A | 11/1998 | Harrison et al. | |
| 5,892,508 A | 4/1999 | Howe et al. | |
| 5,917,481 A | 6/1999 | Rzeszewski et al. | |
| 5,929,850 A | 7/1999 | Broadwin et al. | |
| 5,983,227 A | 11/1999 | Nazem et al. | |
| 5,996,011 A * | 11/1999 | Humes | 709/225 |
| 6,005,565 A | 12/1999 | Legall et al. | |
| 6,029,195 A | 2/2000 | Herz | |
| 6,057,872 A | 5/2000 | Candelore | |
| 6,076,094 A | 6/2000 | Cohen et al. | |
| 6,104,820 A | 8/2000 | Soza | |
| 6,172,674 B1 | 1/2001 | Etheredge | |
| 6,177,931 B1 | 1/2001 | Alexander et al. | |
| 6,252,586 B1 | 6/2001 | Freeman et al. | |
| 6,260,192 B1 | 7/2001 | Rosin et al. | |
| 6,286,005 B1 * | 9/2001 | Cannon | 705/14.66 |
| 6,314,577 B1 | 11/2001 | Pocock | |
| 6,351,596 B1 | 2/2002 | Ostrover | |
| 6,360,227 B1 | 3/2002 | Aggarwal et al. | |
| 6,408,294 B1 * | 6/2002 | Getchius et al. | 1/1 |
| 6,553,178 B2 * | 4/2003 | Abecassis | 386/291 |
| 6,675,161 B1 | 1/2004 | Suchter | |
| 6,684,240 B1 * | 1/2004 | Goddard | 709/217 |
| 6,704,787 B1 | 3/2004 | Umbreit | |
| 6,760,916 B2 | 7/2004 | Holtz et al. | |
| 6,973,665 B2 * | 12/2005 | Dudkiewicz et al. | 725/46 |
| 7,028,250 B2 * | 4/2006 | Ukrainczyk et al. | 715/202 |
| 7,197,715 B1 | 3/2007 | Valeria | |
| 7,200,852 B1 * | 4/2007 | Block | 725/28 |
| 7,260,823 B2 * | 8/2007 | Schlack et al. | 725/9 |
| 7,552,458 B1 * | 6/2009 | Finseth et al. | 725/34 |
| 7,664,636 B1 * | 2/2010 | Hirschberg et al. | 704/231 |
| 7,721,307 B2 * | 5/2010 | Hendricks et al. | 725/34 |
| 7,757,250 B1 * | 7/2010 | Horvitz et al. | 725/35 |
| 8,086,491 B1 * | 12/2011 | Matz et al. | 705/14.66 |
| 2001/0001160 A1 | 5/2001 | Shoff et al. | |
| 2001/0020298 A1 | 9/2001 | Rector et al. | |
| 2002/0032907 A1 | 3/2002 | Daniels | |
| 2002/0056109 A1 | 5/2002 | Tomsen | |
| 2002/0059588 A1 | 5/2002 | Huber et al. | |
| 2002/0073421 A1 | 6/2002 | Levitan et al. | |
| 2002/0092019 A1 | 7/2002 | Marcus | |
| 2002/0124252 A1 | 9/2002 | Schaefer et al. | |
| 2002/0133506 A1 | 9/2002 | Yamato | |
| 2002/0138836 A1 | 9/2002 | Zimmerman | |
| 2002/0162108 A1 | 10/2002 | Lin-Hendel | |
| 2002/0184621 A1 * | 12/2002 | Namvar | 725/25 |
| 2002/0194592 A1 | 12/2002 | Tsuchida et al. | |
| 2002/0194593 A1 | 12/2002 | Tsuchida et al. | |
| 2002/0194595 A1 | 12/2002 | Miller et al. | |
| 2002/0194596 A1 | 12/2002 | Srivastava | |
| 2003/0028871 A1 | 2/2003 | Wang et al. | |
| 2003/0028884 A1 | 2/2003 | Swart et al. | |
| 2003/0032409 A1 | 2/2003 | Hutcheson et al. | |
| 2003/0051238 A1 | 3/2003 | Barone, Jr. | |
| 2003/0061610 A1 | 3/2003 | Errico | |
| 2003/0088874 A1 | 5/2003 | Bazin et al. | |
| 2003/0097657 A1 | 5/2003 | Zhou | |
| 2003/0101449 A1 | 5/2003 | Bentolila et al. | |
| 2003/0101451 A1 | 5/2003 | Bentolila et al. | |
| 2003/0126227 A1 | 7/2003 | Zimmerman et al. | |
| 2003/0126600 A1 | 7/2003 | Heuvelman | |
| 2003/0192045 A1 * | 10/2003 | Fellenstein et al. | 725/29 |
| 2005/0028191 A1 * | 2/2005 | Sullivan et al. | 725/28 |
| 2005/0044037 A1 * | 2/2005 | Lawrence et al. | 705/38 |
| 2005/0165686 A1 | 7/2005 | Zack et al. | |

OTHER PUBLICATIONS

"AllNet Devices:—Report: Interactive TV Soon to Become Direct Marketing Tool,"www.allnetdevices.com, Feb, 21, 2010, 14 pages.

Liberate Technologies, www.solutions.liberate.com, date unknown, 7 pages.

* cited by examiner

METHODS, SYSTEMS, AND PRODUCTS FOR CONTENT BLOCKING

CROSS-REFERENCE TO RELATED APPLICATIONS

This application is a continuation of U.S. application Ser. No. 12/869,792, filed Aug. 27, 2010 and now issued as U.S. Pat. No. 8,136,135, which is itself a continuation of U.S. application Ser. No. 10/176,939, filed Jun. 20, 2002 and now issued as U.S. Pat. No. 7,818,764, with both applications incorporated herein by reference in their entirety.

FIELD OF THE INVENTION

The present invention generally relates to networked media delivery systems. More particularly, the present invention relates to a method and system for identifying, selecting, and presenting substitute content in place of blocked content. More particularly still, the present invention relates to monitoring blocked content to control presentation of desired content.

BACKGROUND OF THE INVENTION

Computer and television networks have become the predominant means through which individuals receive media content, such as entertainment and information. As technology has improved, media content providers, using computers and television, have been able to provide more and more media content to larger and larger audiences. Broadcast, cable, and satellite television providers transmit television signals containing vast amounts of content, such as movies, news, special interest shows, audio, advertising, and home shopping programs, among others. It is not uncommon for cable and satellite television viewers to have over one hundred channels to choose from. Internet service providers similarly transmit vast amounts of content of various types to computers via the Internet. Computer users have thousands of Internet sites to choose from. When a computer user accesses an Internet site, the user is often provided a large amount of content, such as advertisements, promotions, links, and others.

One problem with current approaches toward media content distribution is that there is too much content provided to any given user. In an attempt to maximize viewership and/or profits, content providers typically transmit content to as many viewers as possible, who are able to receive the content (e.g., via television signals, internet transmissions, etc.). From the user's perspective, the massive amount of transmitted content results in an "information overload" effect. Viewers are inundated with such a vast amount of content that effectively choosing what they most want to view becomes difficult. Viewers simply do not have time to view all of the content, and therefore attempt to be selective. Moreover, for any given viewer, the content that streams into the viewer's home includes a large amount of content that the viewer will not want to watch.

Most computer and television users know a priori (i.e., before receiving it) of certain categories of content that they will not want to view based only on the type of content. For example, many users, particularly parents, do not want pornographic content to be an option for selection on their television or computer. As another example, many users may not want to view sports, while other viewers may know a priori that they do not want to view any sports, except bowling. Many viewers may know before hand that they will never choose to watch cooking shows. Thus, television and computer users frequently know ahead of time of certain categories of media content that they will not want to view. Unfortunately, notwithstanding users' a priori knowledge, content providers typically broadcast the same content to everyone. For any given user, much of that content is unwanted.

In the area of broadcast television, a user typically cannot easily block unwanted content. When a user receives a television signal containing a wide variety of content, there will typically be unwanted content mixed with content the user does want. The user typically must become aware of the unwanted content, and learn enough about the unwanted content in order to make the decision to block the content by, for example, changing the channel. Since unwanted content is often mixed with wanted content, a user typically cannot simply reject all content from a given television station without also rejecting desired content. For example, although a user may have the option to deselect a cable channel through the user's cable television provider, if the user does so, he/she may be unknowingly giving up wanted content. Thus, simply deselecting a channel does not adequately solve the problem of blocking content.

One possible solution, in the area of television, is a programming guide (PG). A PG typically presents all available television options in a scrolling fashion across the TV screen. PGs are difficult to read and confusing because they simultaneously present too much information and too little information for a discriminating viewer. PGs present too much information because they provide descriptions for every item of available content, including unwanted content. The user typically must read through all the descriptions to determine his/her preferred content. So many channels are typically presented on a PG that a viewer could easily miss a desired show while reading all the options, many of which are unwanted. PGs present too little information for each available content item because the descriptions are necessarily short due to limited space and time in the guide. PG descriptions are frequently not descriptive enough to allow a discriminating viewer to effectively determine whether any particular content item should be blocked.

On the Internet, content providers attempt to direct content to users based on past selections that the user has made. Based on user selections, the content provider transmits a unique piece of data to users' computers, so that the content provider can later recognize when a user revisits a site. This unique piece of data is often referred to as a 'cookie.' When the content provider recognizes a cookie that was previously stored on the user's computer, the content provider may direct content to the user based on the user's past selections. Although this approach may tend to block content that the user does not want, many users find it intrusive and a violation of their privacy because the cookie is stored on the user's computer without the user's knowledge of it, and the cookie is later transmitted to the content provider, again without the user's knowledge.

Unfortunately, traditional methods and systems do not effectively block content from being presented to the user that is known a priori to be unwanted. Prior approaches toward blocking unwanted content have either put the burden on the user to block content by reading confusing guides and sorting through hundreds of options, which wastes valuable time, or violates users' privacy by downloading information unknown to the user and/or accessing the user's client device without the user knowledge. Thus, a need exists for content to be automatically blocked so that users are not burdened with wasting user time sorting through vast amounts of content, which is known a priori to be unwanted.

Even if unwanted content is effectively blocked, such as by the user changing the channel, the user typically wants alternative desired content. Prior approaches require that the user exert effort and time finding alternative content; e.g., the user must find a new channel to watch. Frequently, while finding alternative content, the user views several unwanted content items (e.g., advertisements, movies, etc.) before finding satisfactory alternative content, for example, while the user is changing television channels. Consequently, existing methods do not adequately provide users with alternative, substitute content without significant effort on the part of the user.

Furthermore, when the user transitions to alternative content, the user is currently not notified when the prior unwanted content is finished. Using current approaches, no way exists for a user to automatically return to previous content when blocked content ends. Thus, a user may need to continuously switch back and forth between two channels to determine whether the blocked content has ended. Currently, due to the significant effort of the user in switching back and forth between channels, the user may miss desired content that follows the unwanted content because the user is unaware that the unwanted content is finished.

It is with respect to these and other considerations that the present invention has been developed.

SUMMARY OF THE INVENTION

The present invention relates to a system and method of blocking content, such as advertisements and other content items, which may be less preferred or unwanted by a user. The system and method involve a server device that tags content based on content type and then sends the tagged content to a client device. The client device receives the tagged content and uses the tags to block content locally. While the unwanted content is blocked, the blocked content is monitored to determine when it terminates. A user profile contains tag information representing the types of content that the user prefers less or does not want to be presented. Substitute content may be identified when content is blocked. Upon identifying substitute content, the substitute content is presented to the user in place of the blocked content. When blocked content ends, other content may be selected and presented. The other content may be content that was being presented prior to blocking, such as a default content, or user-selected content.

Embodiments of the present invention provide for automatically substituting alternative content for content that is determined to be unwanted. One embodiment dynamically presents alternative content in the place of undesired content. Furthermore a seamless transition is made from undesired content to alternative content that is more likely desired. Additionally, a variety of alternative content sources are made available to the user to be dynamically selected when blocked content is identified.

In one embodiment, the invention relates to a method of identifying blocked content based on a user profile and/or user selections and identifying substitute content to present in place of the blocked content. Tagged content is delivered to the user's client device. Using category content tags, a client device determines which, if any, content is to be blocked. In one embodiment, the client identifies one or more content items to substitute for the blocked content based on preference data. Blocked content is monitored to determine when the blocked content ends.

Another embodiment includes a method of blocking unwanted content in a distributed network by receiving tagged content, determining that the tagged content should be blocked, blocking the tagged content, and monitoring blocked content. The method may further include notifying a when blocked content terminates. A termination notification may be presented to the user.

The termination notification may be audible or visual. The termination notification may prompt the user to 'click' on a predetermined area to initiate a switch to alternative content after the blocked content terminates. The termination notification may include a list of options related to content to switch to after termination of the blocked content.

Yet another embodiment includes a client system operable to present substitute content in place of blocked content including a receive module receiving tagged content from a server system, a user profile having tags related to content that is to be blocked, a user profile interface in operable communication with the user profile module operable to transmit tags in the user profile to the analysis module, an analysis module coupled to the receive module and the user profile interface operable to determine if received tagged content is to be blocked based on tags in the user profile and present substitute content if the received tagged content is to be blocked, and a user input/output module coupled to the analysis module operable to receive substitute content from the analysis module for presentation.

The analysis module may include a content insertion engine communicating with the receive module and a prestored content storage, a blocking module receiving tagged content and comparing the tagged content to tags in the user profile, and a presentation module receiving a blocking signal identifying blocked content from the blocking module and presenting substitute content in place of the blocked content. The analysis module may further include a monitoring module that monitors whether and when blocked content has terminated. The monitoring module generates one or more signals indicating when blocked content will or has terminated.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION

Embodiments of the present invention are described with regard to a number of associated figures. Embodiments generally provide methods and systems for monitoring blocked content and choosing/presenting content when blocked content ends. More specifically, embodiments provide unique methods and systems for presenting content automatically or in response user input. Still more specifically, embodiments relate to unique methods and systems for notifying a user that blocked content has ended or will imminently end, and accepting user input in response to the notification.

Figure 1:
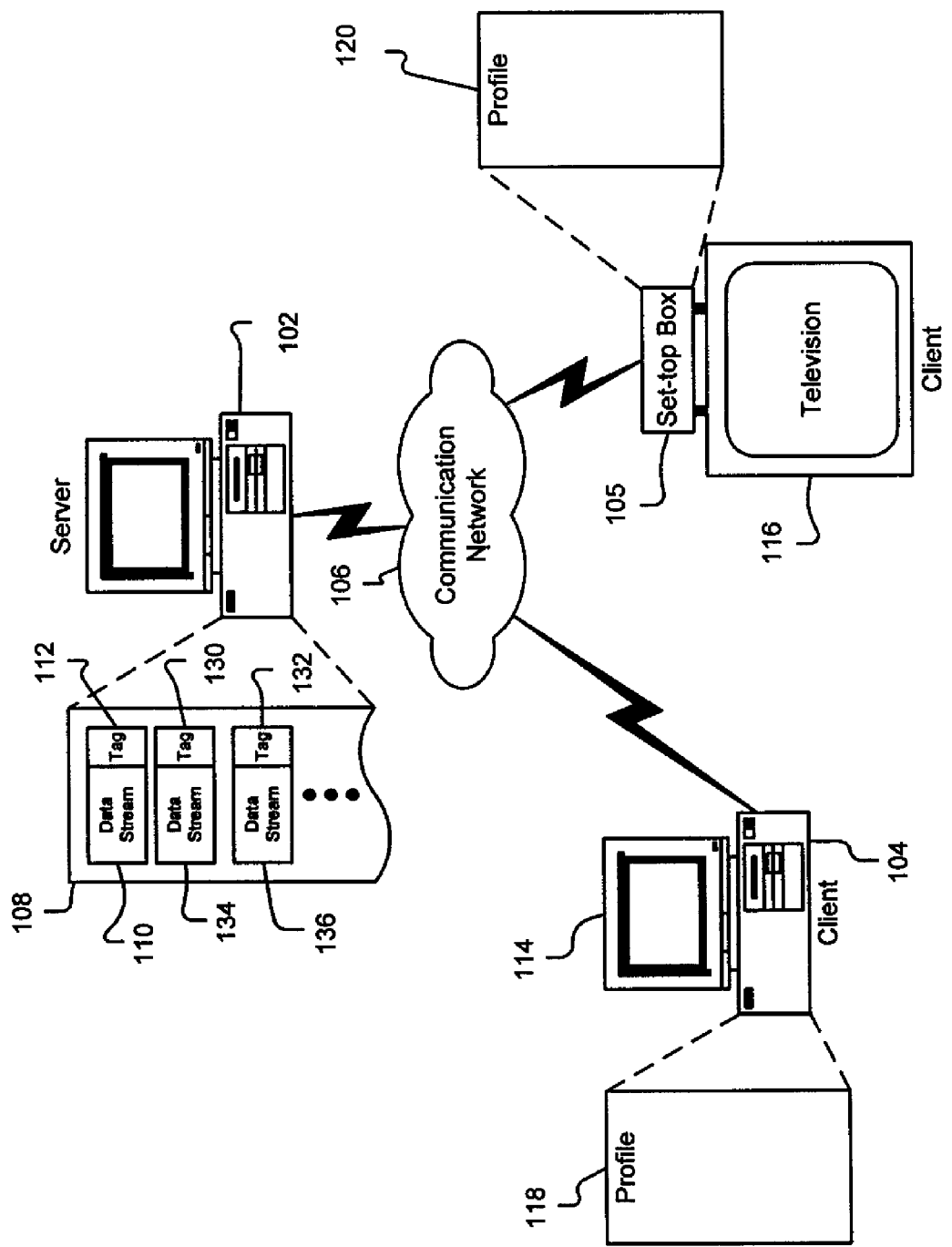
FIG. 1 is an exemplary operating environment implementing an embodiment of the present invention.

FIG. 1 illustrates an exemplary operating environment 100 employing an embodiment of the present invention. A server device 102 communicates with one or more client devices, such as client device 104 and/or client device 105, via a communication network 106. Server device 102 transmits media content, such as, but not limited to, video, audio, text, or executable programs, over the communication network 106 to be used by the client devices 104 and/or 105. Each of the client devices 104 and/or 105 has an output device, such as a computer monitor 114, or a television screen 116, for presenting media content to the user.

The server device 102 has memory 108 that stores media content in the form of data streams 110, 134, and 136. The server device 102 also stores an associated tag, such as tags 112, 130, and 132, with each data stream 110, 134, and 136, respectively. Each of the tags 112, 130, and 132 may be unique from the others and may further be associated with user classifications such as user demographics or usage patterns based on generalized demographic information. The tagged data streams 110, 134, and 136 may be transmitted to the client devices 104 and 105. The tags are used by client devices 104 and 105 to block content; i.e., prevent the content from being presented.

In an embodiment, one or more data streams are transmitted with the tags to the client devices 104 and 105. The client devices 104 and 105 determine which, if any, of the received data streams are inappropriate for presentation to the user of the client device 104, 105 by analyzing the tag information. The client devices 104 and 105 have access to a user profile, such as user profile 118 and 120, respectively, that is further used to analyze the tag information to determine which content should be blocked.

In one embodiment, the client device 104 is a computer system, and the server device 102 is a server computer, such as a web server or e-commerce application server. In this embodiment, the communication network 106 may be the Internet communicating data such as Extensible Markup Language (XML) or Hypertext Markup Language (HTML) data to the client device 104. As noted above, the data communicated over the network 106 is tagged. The user profile 118 comprises tags corresponding to user preferences for content received from the Internet. Upon receipt of data stream 110 and its associated tag 112, the desktop computer client 104 evaluates the tag 112 and the user profile 118 to determine if the data stream 110 is to be blocked. In one embodiment, if the tag 112 is listed in the user profile 118, the associated data stream 110 is blocked from presentation to the user of the desktop computer client device 104.

In another embodiment, the client device 105 is a set-top-box (STB). In this embodiment, the communication network 106 may be a satellite television broadcast network and the server 102 may be a head-end of a cable service provider. The cable service provider generally broadcasts programming, advertising, "walled garden" merchandising offers, and other media content. As mentioned above, the media content is broadcasted in the form of data streams 110, 134, and 136 and associated tags 112, 130, and 132, respectively, to the STB 105. The STB 105 evaluates the tags 112, 130, and 132 and the STB user profile 120 to determine if any of the data streams 110, 134, or 136 should be blocked from presentation to the user of the STB 105. The STB 105 does not present to the user the data stream(s) that are inappropriate based on the user profile 120.

While FIG. 1 depicts two types of client devices, a personal desktop computer 104 and a television set top box (STB) 105, it is to be understood that the client devices 104 and 105 may be any device operable to communicate via the communications network 106, and operable to receive a data stream, such as data stream 110 having a tag such as 112. By way of example, and not limitation, the client device 104 may be a personal digital assistant (PDA), a laptop computer, or a cellular telephone, among others. By way of further example, and not limitation, the communication network 106 may be wireless network, an Ethernet, a local area network (LAN), a wide area network (WAN), or a television broadcast network, among others.

Figure 2:
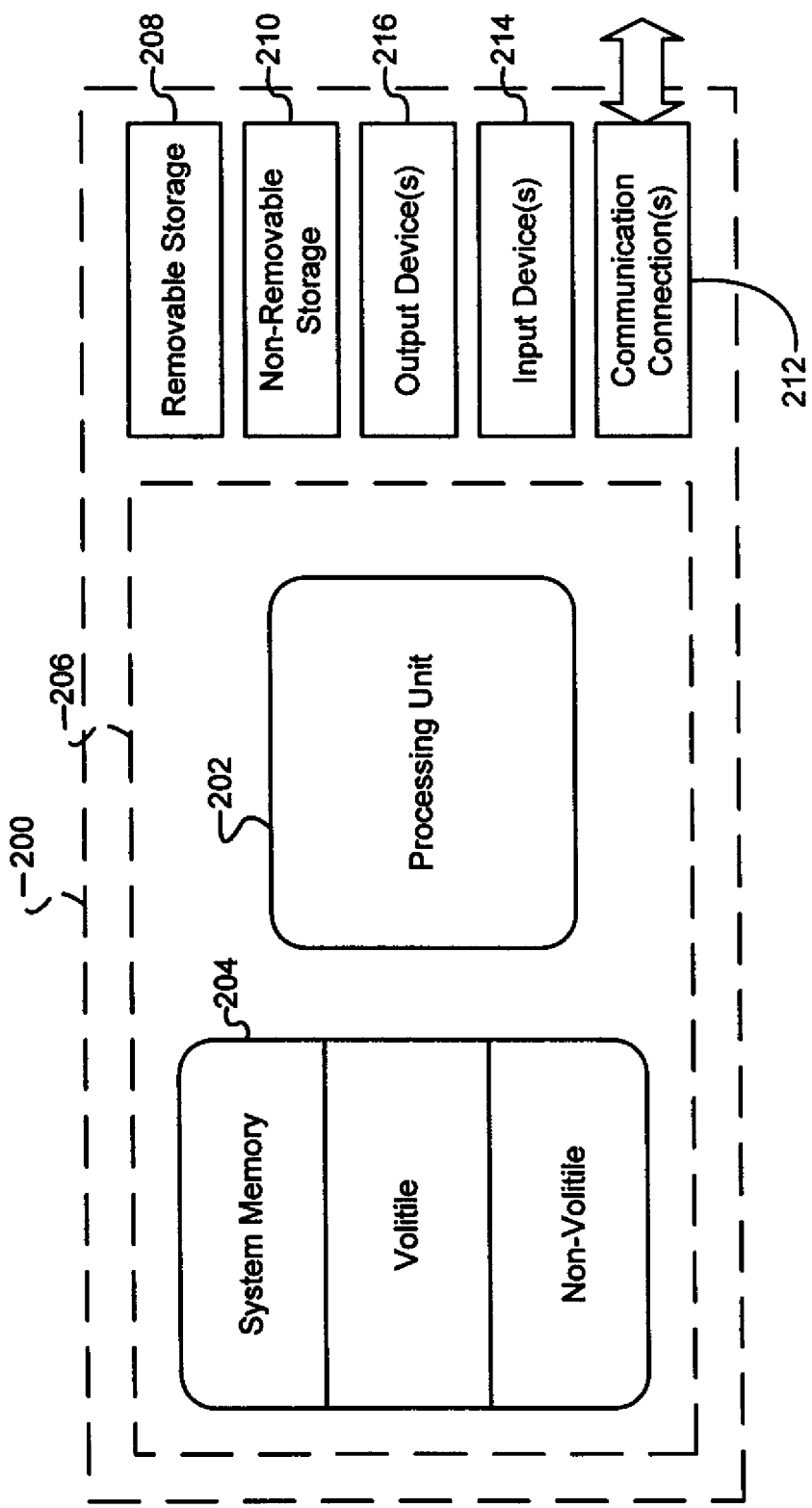
FIG. 2 is a computer system suitable for implementing an embodiment of the present invention.

FIG. 2 illustrates an exemplary system for implementing the invention with a computing device 200. In its most basic configuration, the computing device 200 typically includes at least one processing unit 202 and memory 204. Depending on the exact configuration and type of computing device, the memory 204 may be volatile (such as RAM), non-volatile (such as ROM, flash memory, etc.) or some combination of the two. This most basic configuration is illustrated in FIG. 2 by dashed line 206. Additionally, the device 200 may also have additional features and functionality. For example, the device 200 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. The memory 204, removable storage 208 and non-removable storage 210 are all examples of computer storage media. Computer storage media includes, but is not limited to, Random Access Memory (RAM), Read Only Memory (ROM), Electrically Erasable Programmable ROM (EEPROM), flash memory or other memory technology, CD-ROM, digital versatile disks (DVD) or other optical storage, magnetic cassettes, magnetic tape magnetic disk storage or other magnetic storage devices, or any other medium which can be used to store the desired information and which can be accessed by device 200. Any such computer storage media may be part of the device 200.

The device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The device 200 may also have input device(s) 214 such as keyboard, mouse, pen, voice input device, touch input device, remote control unit, etc. Output device(s) 216 such as a display, speakers, printer, etc. may also be included. All these devices are well known in the art and need not be discussed at length here.

In one embodiment, the computing device 200 is the set-top box (STB) 105. In this particular embodiment, the STB 105 provides a control interface through which a subscriber makes viewing selections by, e.g., using a remote control unit, a keyboard, or a control panel. In providing this interface, the STB 105 performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with the server device 102 over distribution network 106; (4) receives messages from a subscriber input device, such as a remote control unit; (5) translates video signals from a network-native format into a format that can be used by the viewing device; (6) inserts alphanumeric or graphical information (e.g., program guides, menus, etc.) into the video stream to overlay that information on the video image; and (7) provides graphic or audio feedback to the subscriber. Examples of commercially available set-top boxes 105 that satisfy these functions include an SA Explorer 2000 set-top box by Scientific Atlanta, a DCT-5000 set-top box by Motorola/General Instruments, and a Z12C set-top box by Zenith.

Figure 3:
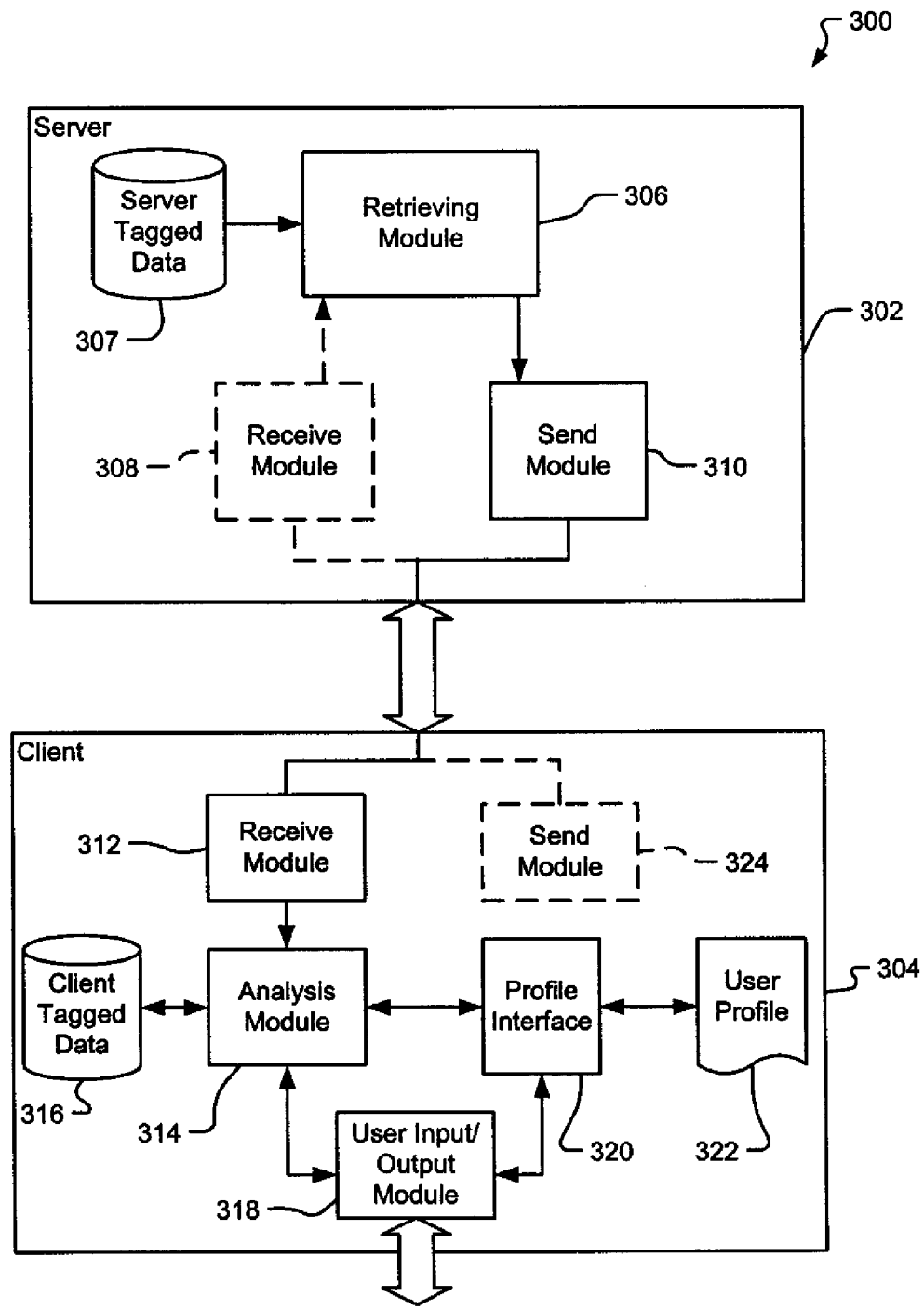
FIG. 3 is module diagram illustrating exemplary software, hardware, or firmware modules running in the computer system of FIG. 2.

FIG. 3 is a functional block diagram of a client-server system 300 employing an embodiment of the present invention. As discussed in more detail below, the client-server system 300 provides tagged content to users of the system 300. The content may include advertising and non-advertising content, including, but not limited to, news, games, programming, books, and sports. A server 302 transmits media content to a client 304, which represents any client system, such as systems 103 and 105 (FIG. 1). Media content sent by the server 302 is in a tagged data stream format, as noted above. Data streams at the server 302 are tagged with tags corresponding to classifications of media content. Classifications include, but are not limited to, content type or format (e.g., advertisement, movie, etc.), subject matter of the content, title, and rating (e.g., G, R, PG-13, etc.). The tags allow the client device 304 to block content that is determined to be objectionable to the user, i.e., predetermined content.

In one embodiment, the server device 302 includes a retrieving module 306, a receive module 308, and a send module 310. The receive module 308 receives requests from the client. An example of a request from the client 304 is a Hypertext Transport Protocol (HTTP) Request for an Internet page on the server 302. In the response to the request, the server 302 uses a send module 310 to send multiple, tagged data streams of content to the client 304. The available tagged content is retrieved from a tagged data memory 307 by the retrieving module 306. The tagged data memory 307 contains tagged content items. As discussed above, tagged content items are generally data streams with data tags that classify the content according to predetermined criteria. In one embodiment, the server device 302 may obtain the tagged content items from content providers (e.g., advertisers), which tag the content based on the predetermined criteria. In another embodiment, the server may tag the content items itself. The send module 310 receives the tagged content items from the retrieving module 306 and transmits the tagged content items to the client 304.

In another embodiment, the server device 302 does not have a receive module 308. For instance, in some cases, the server device 302 primarily broadcasts content onto a broadcast network (e.g., satellite TV, High Definition Television (HDTV)). In this particular embodiment, the client 304 may represent an STB, such as STB 105 (FIG. 1) and the client 304 may receive the broadcasted content from the broadcast network, but may not need to send information back to the server device 302. In this embodiment, the STB 304 simply receives tagged data streams of content sent by the server device 302 and blocks selected content locally. Thus, as discussed below, the send module of the client device 302 may not be necessary in some media content distribution networks, such as a broadcast TV/STB implementation.

The client device 304 includes a receive module 312, which receives the transmitted tagged data streams from the server device 302. The receive module 312 performs all tasks associated with receiving data from the server 302, including, for example, detecting incoming data, and synchronizing to receive the data. The receive module 312 may also decode, digitize, format, and/or buffer incoming tagged data as may be necessary in a particular implementation. The receive module 312 sends the tagged data to an analysis module 314, which analyzes the received tagged data. The analysis module 314 determines which, if any, of the tagged data is to be blocked from presentation to the user. The process of determining whether tagged data should be blocked is discussed in more detail below. If the analysis module 314 determines that an item of tagged data is to be blocked, the analysis module 314 does not present that item to the user. In this embodiment, data is received in a particular manner; i.e., the wanted data is interleaved with unwanted data. Interleaving data is discussed in more detail with respect to FIG. 6 below.

In one embodiment, the analysis module 314 stores the received tagged data in a tagged data memory 316. The analysis module 314 may store the tagged data in any arrangement in the tagged data memory 316 that is suitable for the particular implementation. For example, the analysis module 314 may group certain types of content together. The analysis module 314 may group advertising content together, games content together, movies content together, etc. The tagged data is generally organized in the tagged data memory 316 in a way to facilitate quick and efficient access, but such organization is not necessary. In an alternative embodiment, the analysis module 314 passes selected content straight through, without storage, to a user input/output module 318.

The user input/output module 318 performs tasks associated with conducting media content to an output device such as a display monitor, speakers, or a printer (e.g., the output devices 216 in FIG. 2). The user input/output module 318 also performs tasks associated with receiving input from a user, such as mouse clicks, keyboard entry, or remote control entry (e.g. via input devices 214 in FIG. 2). While a user inputs data, the user input/output module 318 detects the user input and may transmit the user input to a profile interface 320 for analysis. In one embodiment, the analysis module 320 evaluates user input to detect patterns in the user input. Based on the detected usage patterns, the profile interface 320 updates a user profile 322.

In one embodiment, the analysis module 314 detects events that trigger presentation content. Events that trigger presentation content are generally referred to as insertion events. The analysis module 314 may receive these events from the server 302 through the receive module 312 or analysis module may receive these events from the user input/output module 318. With respect to events from the receive module 312, an exemplary event may be an advertisement insertion event, which indicates that an ad should be presented to the user. In this case, the advertisement insertion event may be a cue tone contained within the network TV broadcast, which may be transmitted along with other media content from the server 302. In general, insertion events that are received from the server 302 may be referred to as external predetermined events because they arise externally from the client 304 and typically indicate a predetermined time for presentation.

Another type of insertion event that the analysis module 314 may detect is an internal event that arises on the client side. One example of an internal insertion event is a user initiated menu selection from an STB navigator, such as the user requesting a list of available television shows, a list of games that are available to play online or books that are available via an online bookstore among others. Each list of respective items offered may be tagged by the server system and screened by the client device so as to block content items that are not desired. Furthermore, the initial navigator menu presented on the display may be customized manually or automatically at the client device based upon prior user behavior and user profile so as to order the list of available activities or actions (e.g., preferences for television program, games, shopping, news, mail, etc.), thereby presenting the user with a list best matching their probable activities. Additionally, such prior user behavior may be recognized by the client device, whereby content may be exhibited in a predetermined sequence (e.g., preferred content type displayed first upon user initiation of the device).

As a specific example, when a user turns on the user's television set and STB, the user may be immediately presented with content, advertising, programming, etc. which is in accordance with user profile 322. The user may then select a list of options of a certain type of media content using a user input device, such as a remote control, for example. The user may choose, via, for example, a remote control device, a list of games to be shown the list providing many user choices of games. In this example, the analysis module 314 receives a selection signal from the user I/O module 318 and recognizes the user's selection of a list of games as an insertion event. A menu or list of games is then presented so the user is able select the game that to be played. When the user selects one of the games in the list, the analysis module 314 will receive another insertion event to transmit the selected game to the input/output module 318. The analysis module 314, upon receiving an insertion event, accesses the client tagged data 316 to identify appropriate media content that should be displayed to the user by way of the user profile 322.

Referring again to FIG. 3, the receive module 312 transmits tagged data to the analysis module 314, which blocks unwanted tagged data based on tag information stored in the user profile 322. The analysis module 314 determines which, if any, tagged data from the receive module 312 is identified in the user profile 322. In an embodiment, tagged data that is identified in the user profile 322 is not transmitted to the user input/output module 318. In such a case, only content that is not listed in the user profile 322 may be presented to the user. Advantageously, unwanted content as identified by tags in the user profile 322 are not presented to the user. In an alternative embodiment, only tagged data that has corresponding tag information in the profile is presented to the user. In this alternative case, the user is presented only predetermined content with matching tag information.

In one embodiment, the user profile 322 may be manually entered by the user. In another embodiment, the user profile may be automatically generated and/or updated based on analysis of the user's viewing history. In both embodiments the user profile is maintained privately; i.e., the user profile 322 is accessible to the client device 304, but not to external entities, such as the server device 302. Thus, unlike other systems, a user can block undesirable media content without giving up his or her privacy.

In one embodiment, the client device 304 has a send module 324 for sending data, such as requests, to the server device 302. An example of this embodiment is a client computer communicating to a server computer over the Internet, wherein the client computer sends Hypertext Transport Protocol (HTTP) requests to the server computer to browse web pages.

In another embodiment, the client device 304 need not have a send module 324. As discussed above, an example of this embodiment is a STB 105 receiving content from a broadcast TV network. In this embodiment, the STB 105 does not send requests for data. Rather, the server device 302 (e.g., head-end of a cable service provider) is constantly broadcasting content on a number of channels that the STB 105 can switch to. Another example of a client device 304 receiving broadcast TV signal(s) is a TV-equipped computer receiving television signals, such as High Definition Television (HDTV) signals.

With specific reference to an embodiment employing the STB 105, the STB 105 employs modules such as those depicted in FIG. 3 to complete many intelligent functions, including the collecting, storing, exchanging, blocking, monitoring, and displaying of data. To satisfy these functions, the STB 105 has a navigator, an operating system, and a memory buffer.

The operating system is a computer program that, after being initially loaded into the STB 105 by a bootstrap program, manages the other programs, or applications, running on the STB 105. The navigator is a software application running on top of the operating system. The navigator is provided by the user I/O module 318 and generates menu screens and accepts viewer menu selections such as movie orders, preview orders, or requests to enter an interactive "walled-garden" environment that may supply news, offer products, etc. Based on these selections, the navigator directs the analysis module 314 to deliver the selected program, e.g., the analysis module 314 plays the selected movie. In addition, the navigator records viewer selections or event data in memory, such as memory 204. As is discussed below, the recorded viewer selections or event data may be analyzed by the analysis module 314 to detect usage patterns.

Figure 4:
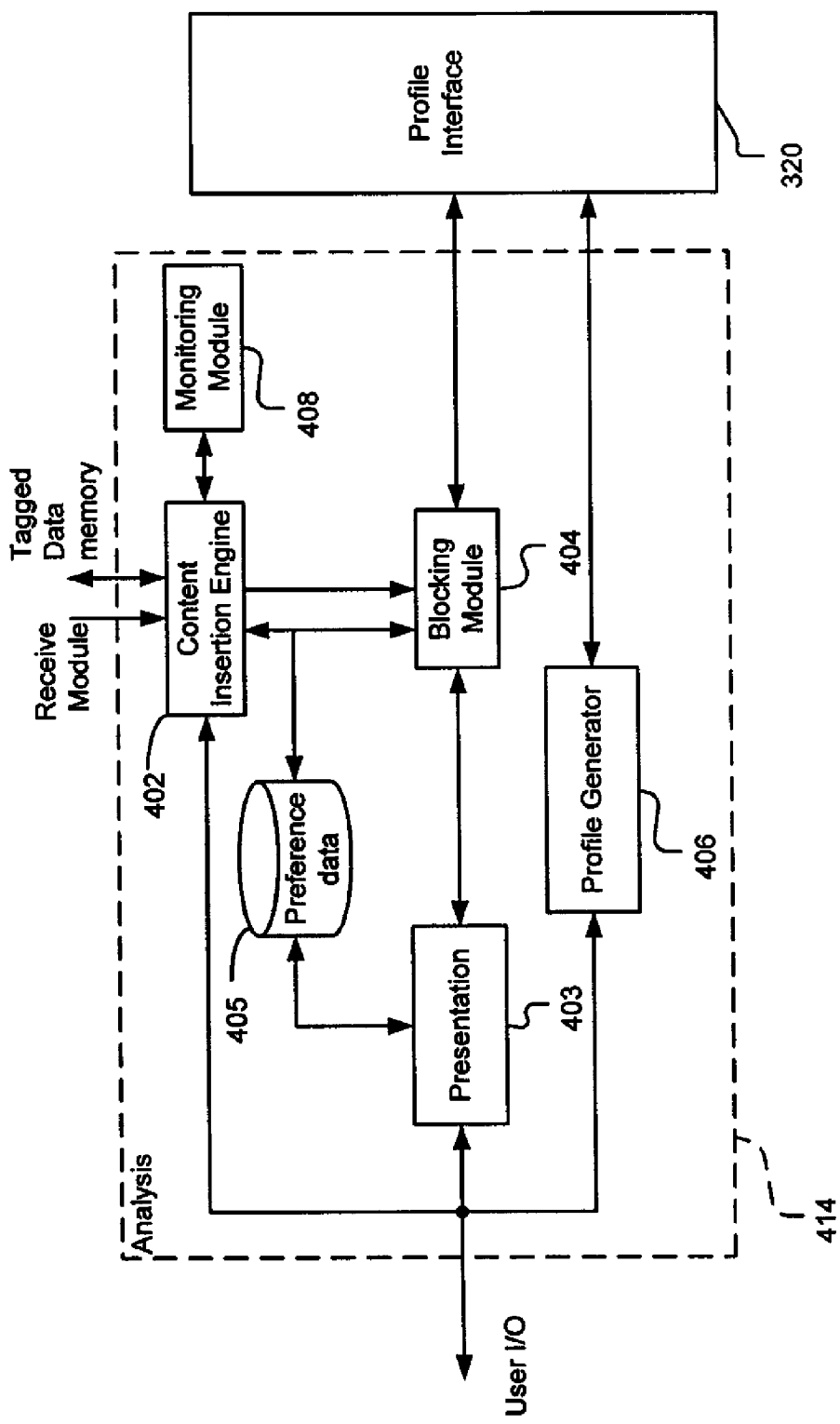
FIG. 4 illustrates an exemplary embodiment of an analysis module interacting with a user profile interface shown in FIG. 3.

With regard to the analysis module 314, an exemplary embodiment of an analysis module 414 is illustrated in FIG. 4. The analysis module 414 includes a content insertion engine 402, a blocking module 404, a presentation module 403, preference data storage 405, a monitoring module 408, and a profile generator 406. The content insertion engine 402 receives data from the tagged data memory 316 and the receive module 312, and detects insertion events based on the received data. When the content insertion engine 402 receives content from the receive module 312 or the tagged data memory 316, the content insertion engine 402 may simply pass the received content on to the blocking module 404, which will evaluate the content and pass it to the presentation module 403, if appropriate. The content insertion engine 402 passes received data on to the blocking module 404 when, for example, the user is viewing a movie. The movie may be interrupted when the content insertion engine 402 receives an insertion event.

Figure 6:
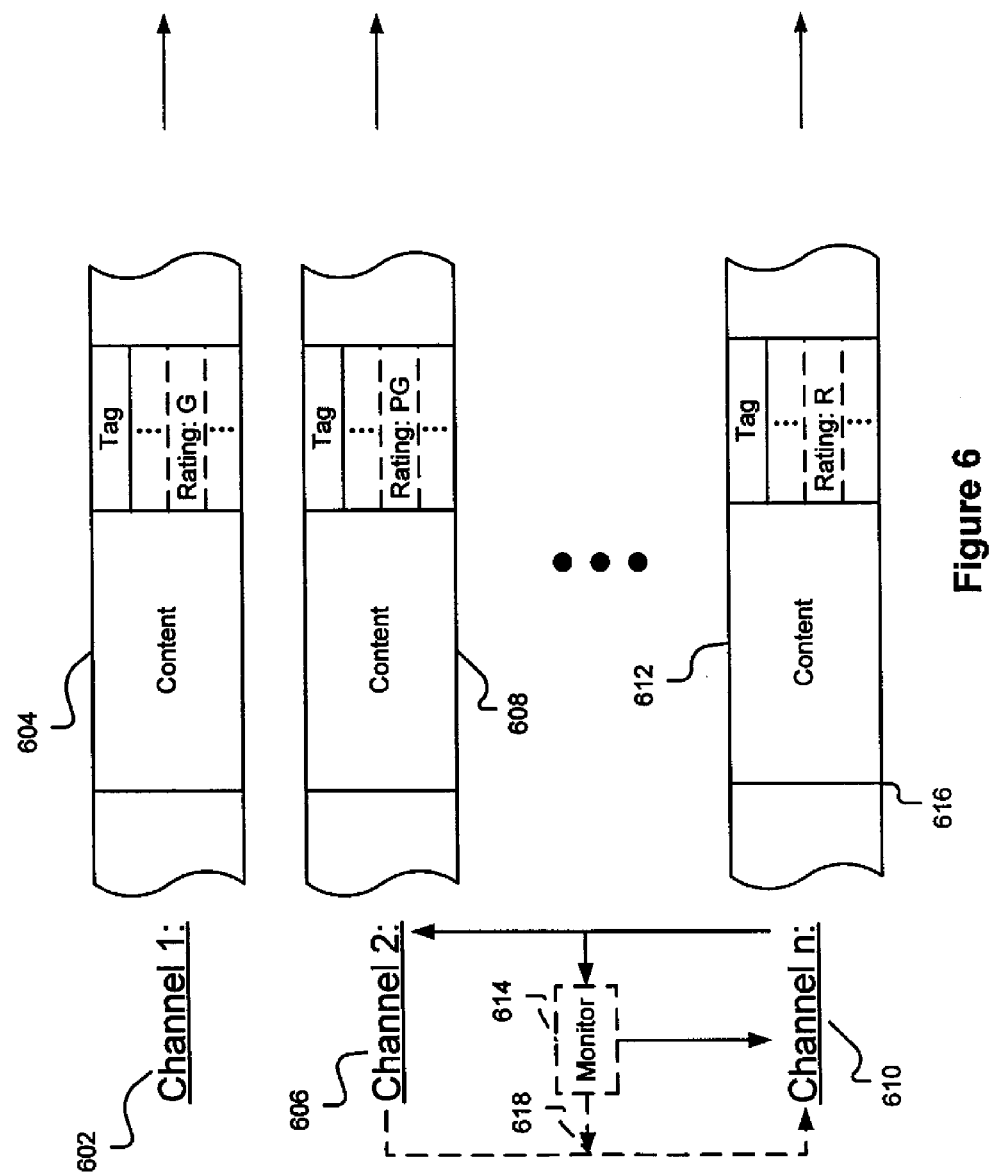
FIG. 6 illustrates multiple channels of tagged content, which may be blocked and/or substituted in an embodiment of the present invention.

If an insertion event occurs, the content insertion engine 402 inserts tagged content from the tagged data memory 316 or from the receive module 312 into a stream of content items being sent to the blocking module 404. By way of example, a network cue-tone for video advertising is one type of insertion event that the content insertion engine 402 may detect. A network cue-tone may cause the content insertion engine 402 to insert an advertisement in the midst of content being sent to the blocking module 404. Another type of insertion event that may occur is receipt of a tag corresponding to a particular type of content, such as an advertisement. Examples of advertisement content with corresponding tags are illustrated in FIG. 6 and discussed in detail below. If an insertion event does occur, the content insertion engine 402 transmits an insert command and associated tagged content to the blocking module 404 to indicate that the media content is to be inserted (i.e., presented to the user).

In response to receiving the insert command, the blocking module 404 analyzes tag(s) received from the content insertion engine 402 and tags from the profile interface 320. The user profile interface 320 accesses data in the user profile 322. More specifically, the user profile interface 320 reads and writes tag data from and to the user profile 322. In operation, the user profile interface 320 may format or encode the tag data that is written to the user profile 322. When reading the encoded data out of the user profile 322, the profile interface 320 formats and/or decodes the data for transmission to the analysis module 414.

In one embodiment, the blocking module 404 is operable to partially and/or completely block content items. Partial blocking occurs, for example, when a movie is being presented to the user, and the blocking module 404 identifies a portion of the movie that is in a category identified in the user profile 322. For example, if "nudity", is identified in the user profile 322 as a subcategory of content that is unwanted, any portions of a movie having nudity will be selectively blocked by the blocking module 404. Other possible subcategories of content that may be blocked are violence and language, among others. In one embodiment, the blocking module is operable to selectively block the video and/or audio portions of the content.

Complete blocking occurs, for example, when a movie tag is transmitted to the blocking module 404 that has a rating (e.g., rated X) that is identified in the user profile 322 as inappropriate. In this example, any movie with a rating of "X" will be completely blocked from presentation. Categories and subcategories of content are discussed in more detail below.

In one embodiment of the analysis module 414, the blocking module 404 determines whether content in the tagged data memory 316 should be blocked from presentation to the user based upon tags in the user profile 322. As is discussed below in more detail, the tags in the tagged data memory 316 may be compared to the tags in the user profile 322. If none of the tag data 322 matches a tag, the blocking module 404 transmits the tag and content to the presentation module 403 for output to the user I/O module 318. In this embodiment, tags that match any tag data in user profile 322 are not transmitted to the presentation module 403.

The monitor module 408 receives information from the content insertion engine 402 regarding blocked content, user selections, received content, among others. The monitor module 408 determines if content has been blocked and monitors the blocked content. In one embodiment, the monitor module 408 receives user channel selections from the content insertion engine 408. The monitor module 408 uses the user channel selections to identify content that the user has manually blocked (e.g., by changing the channel). In another embodiment, the monitor module 408 receives blocking information from the blocking module 404. The blocking information notifies the monitor module 408 of content that is blocked. In response to receiving blocking information, the monitor module 408 monitors various aspects of the blocked content.

In one embodiment, the monitor module 408 monitors termination of the blocked content. When blocked content terminates, the monitor module 408 generates a termination signal indicating that the blocked content has terminated. The content insertion engine 402 receives the termination signal and, in response, generates a termination notification. The termination notification may be presented to the user to let the user know that the blocked content has terminated. Embodiments of termination notifications are discussed in detail with regard to FIGS. 20-22.

In another embodiment of the monitor module 408, the monitor module 408 monitors when blocked content will end. After determining when the blocked content is to end, the monitor module 408 generates a time remaining signal. The time remaining signal includes a time value representing a time-duration until the blocked content will end. The content insertion engine 402 receives the time remaining signal and causes a time remaining notification to be presented to the user. Knowing the time remaining for the blocked content, the user can make content selections based on the time remaining Embodiments of time remaining notifications are discussed in more detail with regard to FIGS. 20-22.

The profile generator 406 receives data from the user I/O module 318 and updates the profile 322, via the profile interface 320, according to inputs from the user. In one embodiment, the profile generator 406 dynamically updates the user profile 322 based on user selections, so that when the blocking module 404 accesses the user profile 322, the blocking module 404 will analyze the received tags and content based on the most recent user preferences indicated by the profile 322. Alternatively, profiles may be static, and/or predetermined. An example of a predetermined user profile 322 is a user profile that may be obtained from an Internet site, which may provide a set of pregenerated (i.e., created in advance) user profiles from which users may select and download. The profile generator 406 preferably organizes tag data in the user profile 322 for fast and efficient access.

The user profile 322 is preferably stored in memory accessible by one or more microprocessors of the client device 304. The memory that stores the user profile 322 can be any memory medium known in the art, including, but not limited to, Personal Computer Memory Card International Association (PCMCIA) memory, Random Access Memory (RAM), Read Only Memory (ROM), Electrically Erasable Programmable ROM (EEPROM), or hard disc drive memory. It should be understood that the user profile 322 need not be stored contiguously in memory and may be separated in a memory medium accessible through a file system that maps memory locations to data. In practice, one or more of the modules shown in FIGS. 3-4 may be integrated on a single integrated circuit in any combination. Alternatively, they may be separately implemented in software or hardware.

The user profile 322 includes tag data associated with categories of content that the user does not want to be presented. In one embodiment, the user may create the user profile 322 by selecting tags from a set of predetermined tags. The set of predetermined tags may be standard tags that are used by the media industry to describe categories of content. The tags are appended to media content prior to transmission to the client device 304. To illustrate how the tags may be interpreted or used by the client device 304, tags are described in detail below.

With regard to the preference data storage 405, the preference data storage 405 stores data related to a user's viewing history. The preference data 405 may include data such as, but not limited to, preferred tags, time duration of viewing categories/subcategories of content, and user input, such as mouse clicks or remote control data entries. In one embodiment, the presentation module 403 transmits preference data to the preference data storage 405. The presentation module 403 may receive the preference data from a number of sources including the user I/O module and/or the blocking module 404. For example, the presentation module may detect a user data entry associated with choosing a particular category of content. In response, the presentation module 403 may store the time of the data entry, the tag data, and the duration of viewing the associated tagged content.

As another example, the presentation module 403 may detect what is currently being presented and store the associated tag and viewing duration in the preference data storage 405. The presentation module 403 may organize the preference data 405 in any number of ways. In one embodiment, the presentation module 403 organizes preferred tags in order from most preferred to least preferred. In this embodiment, the presentation module 403 determines a level of preference for the content tags. In another embodiment, the level of preference may be determined by the time duration of viewing the associated tag. In this embodiment the tags that are viewed for the longest amount of time are designated as having a higher level of preference.

In another embodiment, the presentation module 403 organizes the preference data 405 hierarchically based on tag categories or other parameters such as duration of viewing. Later, as will be discussed below, preference data 405 may be used in an embodiment of the present invention to substitute preferred content in place of blocked content.

In another embodiment of the preferred data storage 405, tag fields (discussed in FIG. 5) are stored with associated weights that identify a level of importance associated with a given tag field. Using the weighted tag fields, the analysis module (e.g., 314 of FIG. 3) can identify more or less preferred content for presentation to the user. Exemplary methods of using tag field weights are discussed in following figures. Tag field weights may be particularly useful in presenting a list of preferred content to the user by ordering the content in the list in order of most preferred to least preferred so that the user is able to make content selections quickly and easily. Additionally, when content is to be automatically substituted (as discussed below), tag field weights provide a unique mechanism of predicting most likely preferred content for substitution with blocked content.

In yet another embodiment, the presentation module 403 receives preferred tag data from the user I/O module and stores the preferred tag data in the preference data storage 405. In this embodiment, the preferred tag data may be entered by a user via the user I/O module. The user may enter preferred tag data through a number of mechanisms. In one embodiment, the user enters preferred tag data through a menu presented to the user on the display. In this embodiment, the client device is programmed with a menu of all tags and presents them to the user when the user calls up a menu. The user may select tags that the user prefers through keyboard, hand-held remote, mouse or other input device. From the menu, the user can store the selected tags. When the user stores the selected tags, the tag data is received by the presentation module 403 and stored in the preference data storage 405.

In another embodiment, the user has a numeric representation "card" that has a numeric code associated with sets of one or more predetermined tags. The card may be either in electronic or tangible form. The user may enter the numeric code using a card swiping device attached to the client device, or typing in the numeric code using another input device, such as a keyboard, hand-held remote, mouse, among others. The presentation module 403 receives the numeric code and, in response, identifies a set of tags associated with the code. The set of tags associated with the numeric code may be prestored on the client device or may be obtained over the network from a server computer. The presentation module 403 copies the set of preferred tags identified by the numeric code into the preference data storage 405.

Figure 5:
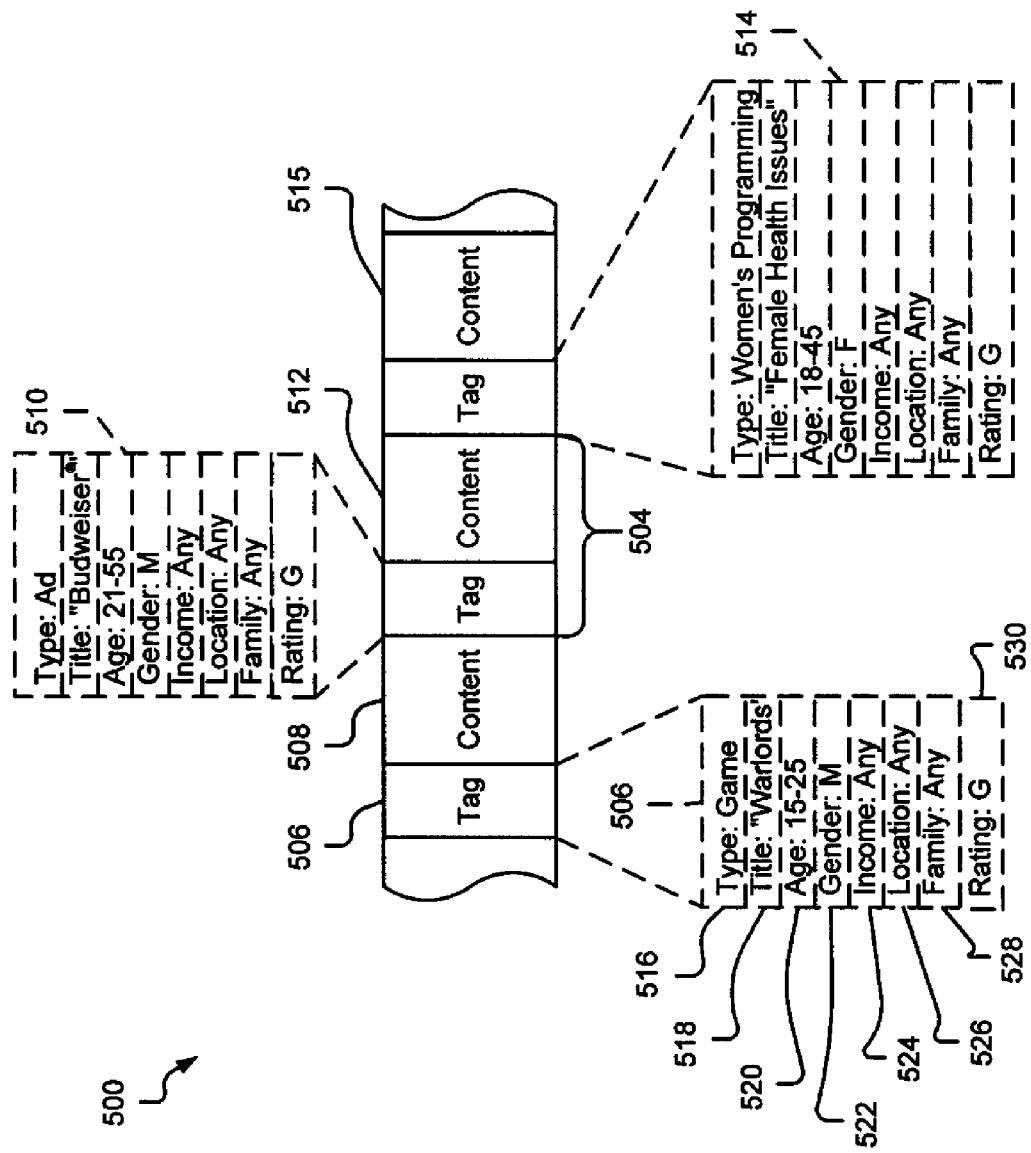
FIG. 5 illustrates an exemplary portion of tagged content that may be advantageously used in combination with an embodiment of the present invention.

A portion of tagged content 500 that may be transmitted to a client device 304 is illustrated in FIG. 5. The portion of tagged content 500 includes tag/content pairs such as pair 504 including a tag. The tag/content pair 504 contains tag 510, and its associated content 512. As discussed above, the content may be any type of content, including, but not limited to, advertisements, movies, news programs. By way of further example, and not limitation, content items may contain descriptions (e.g., title, author, price, theme, etc.) of content such as books, movies, games, etc. Each tag is made up of fields. The fields are each descriptive of a content category or subcategory (described below). In one embodiment, the tags 506, 510, and 514 have a type field 516, a title field 518, an age field 520, a gender field 522, an income field 524, a location field 526, a family field 528, and a rating field 530. As can be seen, the fields, therefore, may describe the associated content in various terms, such as what the content is (e.g., type field 516, or title field 518, etc.), or what type of viewer the content may be appropriate for (e.g., age field 520, gender field 522, rating field 530, etc.).

For example, the tag 510 indicates that the content 512 associated with the tag 510 is an advertisement about Budweiser® beer. The tag 510 further indicates that the content 512 may be most appropriate for males from the ages 21-55. Additionally, the tag 510 indicates that the income level, location, and family characteristics (e.g., single, married, kids, etc.) of the viewer are not relevant with regard to the type of content. The tags 506, 510, and 514, are appended to the content 508, 512, and 515, respectively by the server 302 or a media content provider. The client 304 uses the tags to determine whether the content 508, 512, and 515 is appropriate for the user at the client device 304. The client 304 and server 302 utilize a common tag format.

The tag data in each of the fields may be in any format suitable for the particular implementation and the category. For example, in one embodiment, the age field 520 includes two binary encoded values, representing a minimum age and a maximum age, to specify an age range. As a further example, the gender field 522 may be a single binary value representing either and/or female. The location field 524 may include a series of ASCII encoded numbers indicating a zip code. As will be recognize by those skilled in the art, any method and system of formatting field data to specify categories and subcategories of content may be used. Preferably the tag and field format is substantially standardized among media content providers, service providers, and server and client device manufacturers.

In one embodiment, providers of content to the server device 302 tag the content before making it available to the server 302. The content providers may fill in the fields, such as type, title, age, gender, income, location, and family, with the category data that the provider believes most accurately describes the type of content as it relates to users. In another embodiment, the server device 302 appends the tags to the content. In this embodiment the server device 302 is operable to determine what identifying information is most appropriate to the content and fill in each of the fields accordingly. The server device 302 has a dictionary of categories (e.g., type, title, age, gender, etc.) to select from. The tags that the client device 304 uses in the user profile 322 have categories (e.g., type, title, age, gender, etc) selected from a common set of categories. Thus, the client device 304 and the server device 302 utilize a common tag format having common categories.

Over time, field categories and corresponding category options may change. For example, another category, such as "Education Level", may be added to the tag format. When the tag format changes, the switch to the new tag format at the server device 302 is preferably synchronized with the switch to the new tag format at the client device 304. FIG. 5 illustrates exemplary categories in an exemplary format, and it is to be understood that any field designations may be used that effectively describe the categories or classifications of content that may be distributed to users. In another embodiment, subcategories are used in addition to categories to describe content in more detail.

The "type" field may have "subtypes" that further classify the type. For example, when the type is "movie," the "movie" type may further classify movies into genres such as, but not limited to, westerns, comedy, horror, drama, action, adult, etc. The movie genres are subtypes of movies. Another example of subtyping is a "sports" subtype. Subtypes of sports may be football, basketball, baseball, hockey, etc. As another example, the "family" category may have subcategories of "single," "married," "married with kids," "single parent," and others.

Thus, subcategorizing further describes content based on narrower classifications. The user profile 322 may be automatically or manually updated to track a user's selections of categories and/or subcategories to be blocked. Additionally, as is discussed in more detail below, tags may include a weight value associated with each field category or subcategory, indicating the relative importance of that category or subcategory.

Multiple interleaved channels of content, such as in a broadcast television network, are illustrated in FIG. 6. A user may select any of the channels. Channel 1 (602) contains rated 'G' content 604. Channel 2 (606) contains rated 'PG' content 608. Channel n (610) contains rated 'R' content 612. In one embodiment shown in FIG. 6, a user switches from channel n (610) to channel 2 (606). In an alternative embodiment, a switch is automatically made from channel n (610) to channel 2 (606) when it is determined that rated 'R' content 612 is to be blocked. When a switch is made from channel n (610) to channel 2 (606), a monitor 614 monitors channel n (610) to determine when the rated 'R' content 612 (i.e., blocked content) terminates.

In one embodiment, the monitor 614 identifies the end 616 of the rated 'R' content 612 by detecting a change in the content or signal on channel n (610). In another embodiment, the monitor 614 has a predetermined time duration related to the time duration of the rated 'R' content 612. In the latter embodiment, the monitor 614 can identify the end 616 of the rated 'R' content 612 by counting down from the predetermined time. The monitor 614 may output a time value representing the time duration remaining for the rated 'R' content 612. The time value can be presented to the user to facilitate content selection.

When the monitor 614 identifies the end 616 of the rated 'R' content 612, the monitor may generate a termination signal. The termination signal can be used to facilitate selection of content after the rated 'R' content 612 terminating. In one embodiment, alternative content may be automatically selected after termination of the rated 'R' content 612. For illustrative purposes, the monitor 614 causes a switch 618 from channel 2 (back to channel n (610) after the rated 'R' content 612 terminates. In another embodiment, the content selection is not automatically made, but rather, channel 2 (606) continues to be presented until the user makes a content selection.

In embodiments described herein, the logical operations of the client device 304 and the server device 302 may be implemented as a sequence of computer implemented steps or program modules running on a microprocessor, such as, without limitation, a processor in a personal computer or a computer workstation. It will be understood to those skilled in the art that the client device 304 and the server device 302 of the present invention may also be implemented as interconnected machine logic circuits or circuit modules within a computing system. The implementation is a matter of choice dependent on the performance requirements of the computing system implementing the client device 304 and the server device 302.

The operation, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means known in the art. For example, any number of computer programming languages, such as "C", "C++", Pascal, FORTRAN, assembly language, Java, etc., may be used. By way of further example, and not limitation, any scripting language known in the art may be used, such as Korn shell script. Furthermore, various programming approaches such as procedural, object oriented or artificial intelligence techniques may be employed.

The client device 304 and the server device 302 may be implemented as software modules executed by one or more general purpose computers, such as the general purpose computer 200 illustrated in FIG. 2. As described in greater detail below, the client device 304 may be employed to receive, store, block, and/or present media content, such as movies, games, and/or advertisements. The client device 304 employs computer-readable media for carrying out the various tasks associated with blocking unwanted content from presentation to the user of the client device 304.

Figure 7:
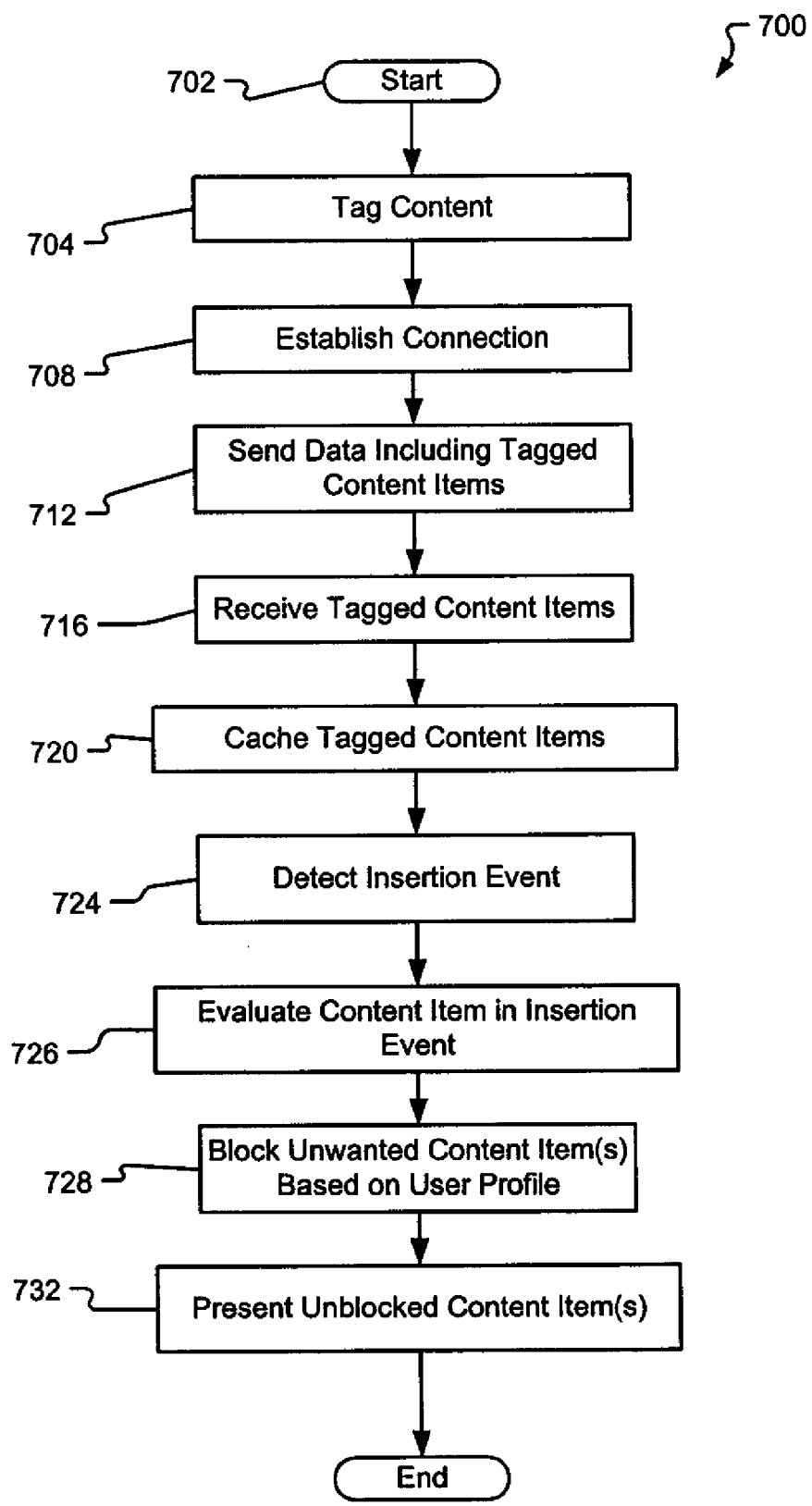
FIG. 7 is a flow diagram illustrating operations carried out in a tagged content distribution system in accordance with an embodiment of the present invention.

An operation flow chart 700 is shown in FIG. 7 illustrating operations performed in a tagged content distribution network in accordance with an embodiment of the present invention. After a start operation 702, a tag operation 704 tags content items that will be transmitted to a client device such as the client device 304. The server device 302 may perform the tag operation 704. Alternatively, an advertiser that provides content to the server device 302 may perform the tag operation 302. The tag operation 704 involves creating a tag describing relevant content categories and associating the tag with one or more content items. As discussed with respect to FIG. 5, in one embodiment, a tag includes field information designating various categories, and/or subcategories.

The tag operation 704 may involve assigning weighting values to tag fields, which indicate a relative importance of each field category. Thus, for example, in the tag operation 704, a tag for a beer advertisement may include age identification information of 21-55, with a relative weight of 1, and an income identification range of $30,000-$100,000, with a relative weight of 0.5. In this example, the tag indicates that the income range identified is less important than the age range that is identified.

Once content is tagged, an establish operation 708 establishes a communication connection between a client device 304 and a server device 302. Establishing a communication connection may be carried out using any means known in the art. By way of example, and not limitation, in an Internet environment a client computer typically send a request (e.g., a Hypertext Transport Protocol request) to a server computer to request a particular web page identified by a Universal Resource Locator (URL). As a further example, a connection may be established in a cable television environment by a set-top-box switching to a channel or transport frequency. Many other methods of establishing a communication connection are known in the art and will fall within the scope of the establish operation 708.

The server device 302 then sends data to the client device 304 in a send operation 712. The data includes one or more of the tagged content items that were tagged in the tagging operation 704. The server may send content items using any transmission protocol known in the art, including proprietary or non-proprietary protocols. Sending the tagged content may include encoding the tagged content items, packetizing and/or formatting the encoded tagged content items, and modulating a carrier frequency with the packetized data. In the send operation 712, the server may also append a unique client device identifier to the tagged content data such that a particular client device 304 is associated with the tagged content items. In a computer Internet environment, the client computer typically has a unique Internet Protocol (IP) address. In a cable television environment, each STB has a unique identifier. In general, each client device 304 may be uniquely identified on the network so that the server device 302 may send tagged content items directly to each client device in the send operation 712.

As discussed above, the tagged content items that are sent in the sending operation 712 may be any content, including advertising. The server device 302 may send the content items in any order applicable to the implementation. For example, in one implementation it may be most efficient for the server device 302 to send all advertisements in a group sequentially or not, and then all video content items, followed by all book content items sequentially, and so on.

In a receiving operation 716, the client device 304 receives the tagged content items that were sent in the sending operation 712. In the receiving operation 716, the client device 304 detects tagged content items that are directed at the client device 304. The client device 304 then demodulates, decodes and formats tagged content items as necessary. Depending on the particular implementation, the receiving operation 716 may involve synchronizing a data signal from the server device 302. In the receiving operation 716, the received tag(s) may be analyzed with reference to a user profile, such as the user profile 322, which may include tag identification related to unwanted content categories.

The client device 304 may cache tagged content items in a cache operation 720. In the cache operation 720, tagged content items are stored in memory (e.g., 204, 208, 210, etc.) that is accessible by the client device 304 for possible later presentation to the user. The tagged content items may be logically stored in memory in any arrangement. For instance, the cache operation 720 may involve logically storing the tagged content items contiguously in memory as they are received. Alternatively, the cache operation 720 may logically group certain types of content (e.g., video content) together in memory. However the content items are arranged logically in memory, it is to be understood that the physical locations in the memory need not follow the logical arrangement.

During operation, an insertion event may be detected in a detect operation 724. An insertion event is an indication to insert one or more content items into a stream of content items being presented to the user 724. The manner in which the content item is presented to the user is generally related either spatially (e.g., on a display monitor) or temporally (e.g., synchronized in time) to other content items that are presented to the user of the client device 304. In the detect operation 714, in a STB/TV or a TV-equipped computer environment, the client device 304 may receive, for example, a cue tone from the head-end, which indicates that an advertisement is to be displayed at a designated time. Also in the STB/TV environment, the client device 304 may receive input from the user to display a menu of content items (e.g., games). In this case, the input from the user is an indication to insert one or more content items (e.g., game content items) in a menu to the user.

After the client device 304 detects an indication to insert content, the client device 304 evaluates the content to be inserted in an evaluate operation 726. In the evaluate operation 726, the tags associated with the insertion event are evaluated based on a user profile (e.g., user profile 322), to determine whether the content associated with the insertion event should be blocked from presentation to the user. Any method of evaluation may be employed in the evaluate operation 726 to block one or more inappropriate content items. A block operation 728 blocks unwanted content items based on results of the evaluation operation 726.

In one embodiment, if a content item is determined to be inappropriate in the evaluate operation 726, the block operation 728 causes a default content item to be presented. Exemplary methods of evaluation are discussed in detail below in reference to FIGS. 9-10. In a present operation 832, the client device 304 presents to the user content items that are not identified in the user profile 322 to be blocked.

Figure 8:
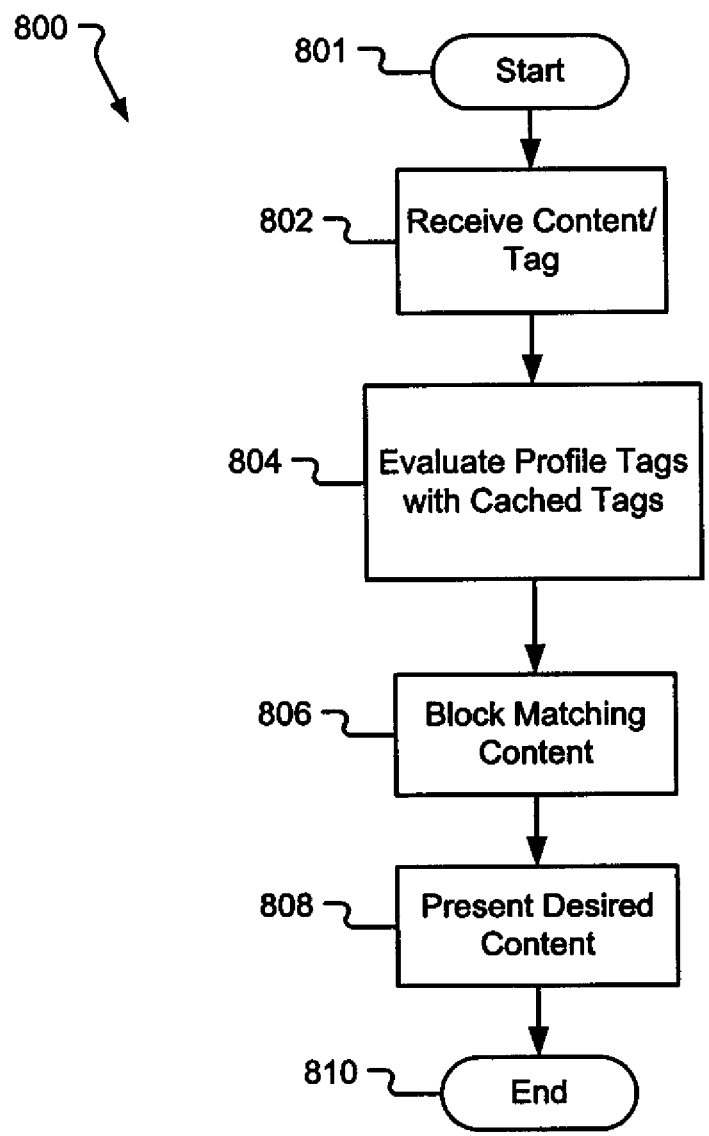
FIG. 8 is a flow diagram illustrating exemplary operations that may be implemented by a blocking module, such as the blocking module shown in FIG. 4.

FIG. 8 is an operation flow 800 including exemplary steps or operations that may be implemented by the blocking module 404 (FIG. 4) to block out media content received from the server device 302 that is less preferred by the user. A receive operation 802 receives a command to insert media content from the content insertion engine 402. An evaluate operation 804 then evaluates the received tags based on tags in the user profile 322 to determine whether tagged data from the content insertion module 402 should be blocked. In the evaluate operation 804 it is determined whether tag category data from the content insertion module 402 match tag category data in the user profile 322. In one embodiment, the evaluate operation 804 compares each field in a tag from the user profile with each field in a tag from the content insertion engine 402. In one embodiment, if a field in both tags matches, the associated content is not presented to the user.

A block operation 806 then blocks the media content having tag data that matches tag data in the user profile 322. In the block operation 806, content that is determined to match corresponding tag data in the user profile is not presented to the user of the client device. Thus, the blocking module 404 (FIG. 4) does not transmit matching content to the presentation module 403. In a present operation 808, the user I/O module 318 presents media content that is not screened in the block operation 806. The present operation 808 presents alternative content other than the blocked content. The operation flow ends at end operation 810.

Figure 9:
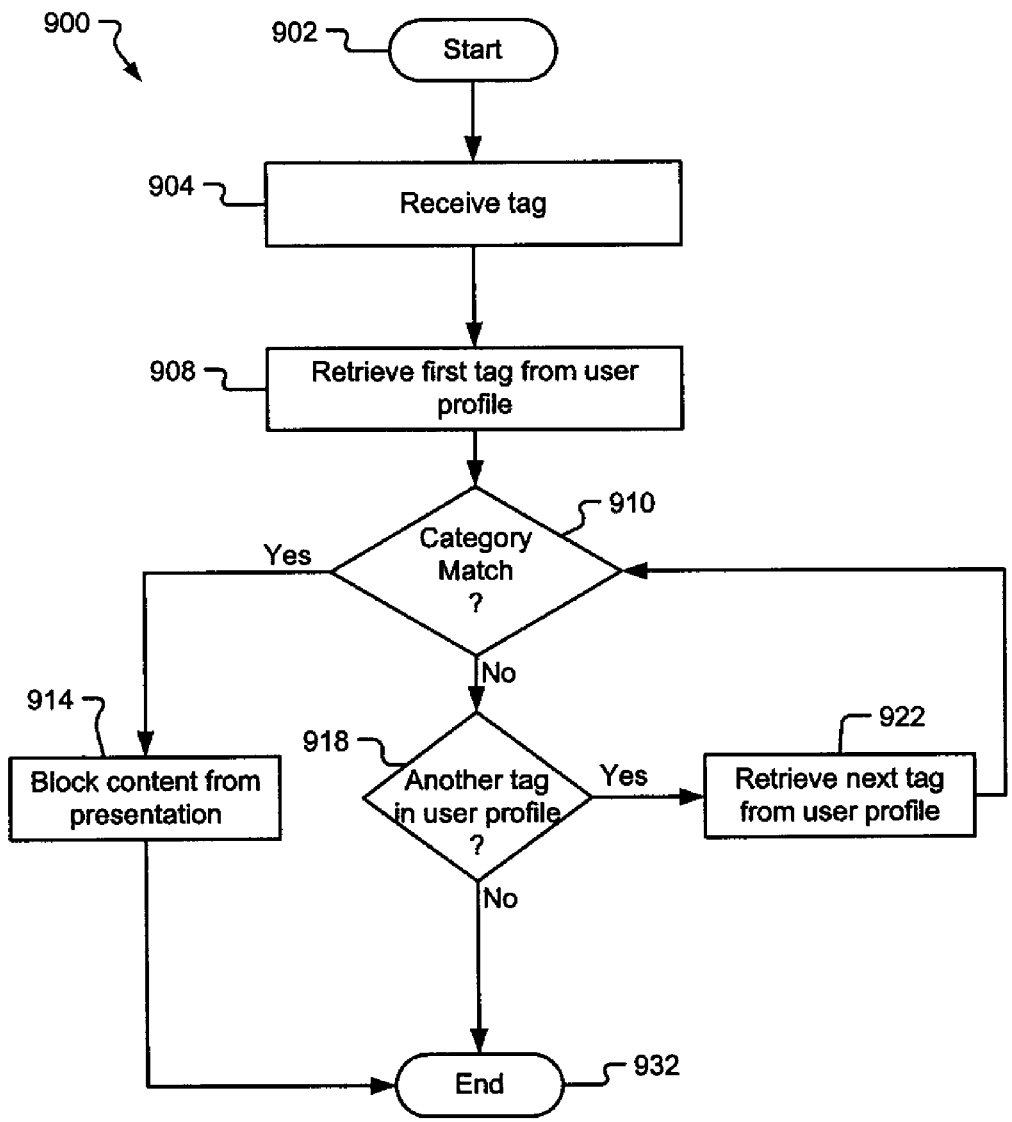
FIG. 9 is a flow diagram illustrating exemplary operations of a particular embodiment of a blocking operation, such as the blocking operation shown in FIG. 8.

FIG. 9 illustrates an embodiment of an evaluate operation 900, such as the evaluate operation 804 (FIG. 8). After a start operation 902, a receive operation 904 receives a tag and content. In one particular embodiment, the content insertion module 402 receives a tag and content from the receive module 312 and keeps track of the order of dispensing tags to the blocking module 404. The blocking module 404 retrieves a tag out of the user profile 322 in a retrieve operation 908.

In a compare operation 910, the blocking module 404 compares the tag from the receive module 312 to the tag from the user profile 322 to determine if the two tags have any matching categories. Comparing the two tags may be accomplished using any method known in the art and depends on how the tags are encoded in the particular implementation. For example, fields in the tags may be encoded as single bits (either on or off). In this example, the comparing operation 910 may perform a bit-masking operation, which is a computationally efficient way of comparing bits.

If it is determined that the two tags retrieved in operations 904 and 908 have matching category data, the blocking module 404 blocks the content received from the content insertion module 402 in a block operation 914. In the block operation 914, the blocking module may transmit alternative content to the presentation module 403. However, if the two tags compared in the compare operation 910 do not match in any category, the blocking module 404 determines whether any more tags exist in the user profile 322. In a determine operation 918, the blocking module 404 reads the user profile 322 to determine if another tag is available for comparison. If so, the blocking module 404 retrieves the next tag from the user profile 322 in a retrieve operation 922. After the next tag is retrieved from the user profile 322, the compare operation 910 compares the next user profile tag with the tag received from the content insertion module 402. If, on the other hand, the determine operation 918 determines that no other tags remain to be compared in the user profile 322, flow branches NO to 926 an end operation 932.

Figure 10:
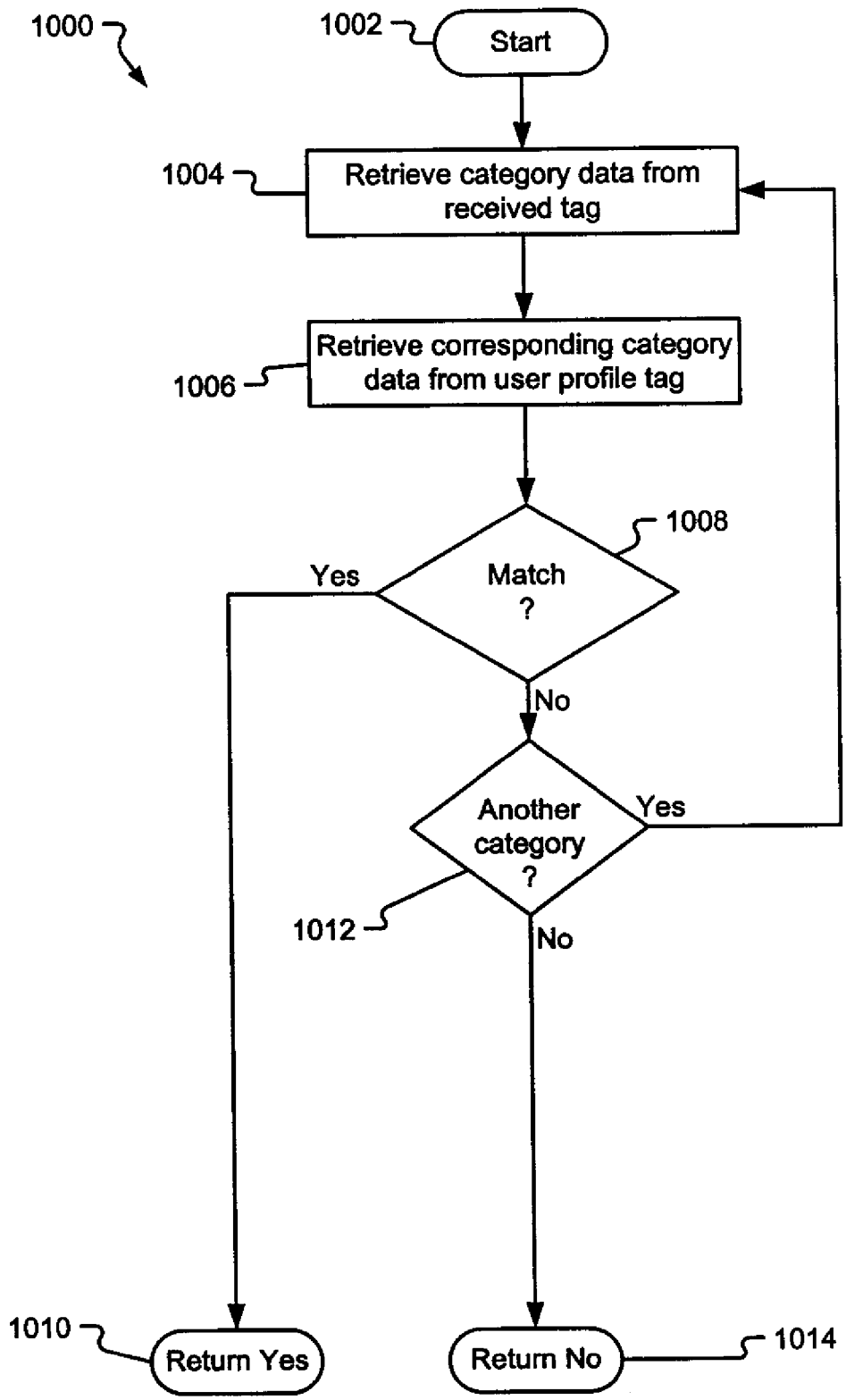
FIG. 10 is a flow diagram illustrating an exemplary process of scoring or comparing tags in accordance with an embodiment of the present invention.

FIG. 10 is an operation flow 1000 illustrating exemplary operations that may be employed in an embodiment of the compare operation 910 of FIG. 9. Input to the operation is a tag from the content insertion module 402 and a tag from the user profile 322. In general, the operational flow 1000 iterates through fields in the tag from the content insertion module 402 and corresponding fields in the tag from the user profile 322, determining if any category data for the tags matches. If any categories match, a "YES" value is returned. Otherwise, a "NO" value is returned.

After a start operation 1002, a retrieve operation 1004, retrieves a category (e.g., type category 516 of FIG. 5) and its field data (e.g., "Game") from the tag that is received from the content insertion module 402. In another retrieve operation 1006, corresponding type field data is retrieved from the user profile tag. In a compare operation 1008 it is determined whether the identifying data for the two associated fields matches. For example, if the type category data is "Game" in both the fields, the fields match. If the category data matches, operation flow 1000 branches "YES" to a return YES operation 1010 returns an indicator that at least one category matches in the two tags being compared. If, in the compare operation 1008, the field data of the content tag does not match that of the user profile tag, a determine operation 1012 determines if another field remains in the tags to be compared.

If the determine operation 1012 determines that another field (e.g., title field 518 of FIG. 5) remains for comparison, the retrieve operation 1004 retrieves the field and its category data from the received tag. Processing continues as before to compare the corresponding field data of the user profile tag. If no more fields remain to be processed in the determine operation 1012, a return NO operation 1014 returns an indicator that the tag from the content insertion module 402 does not match the user profile tag in any categories.

Figure 11:
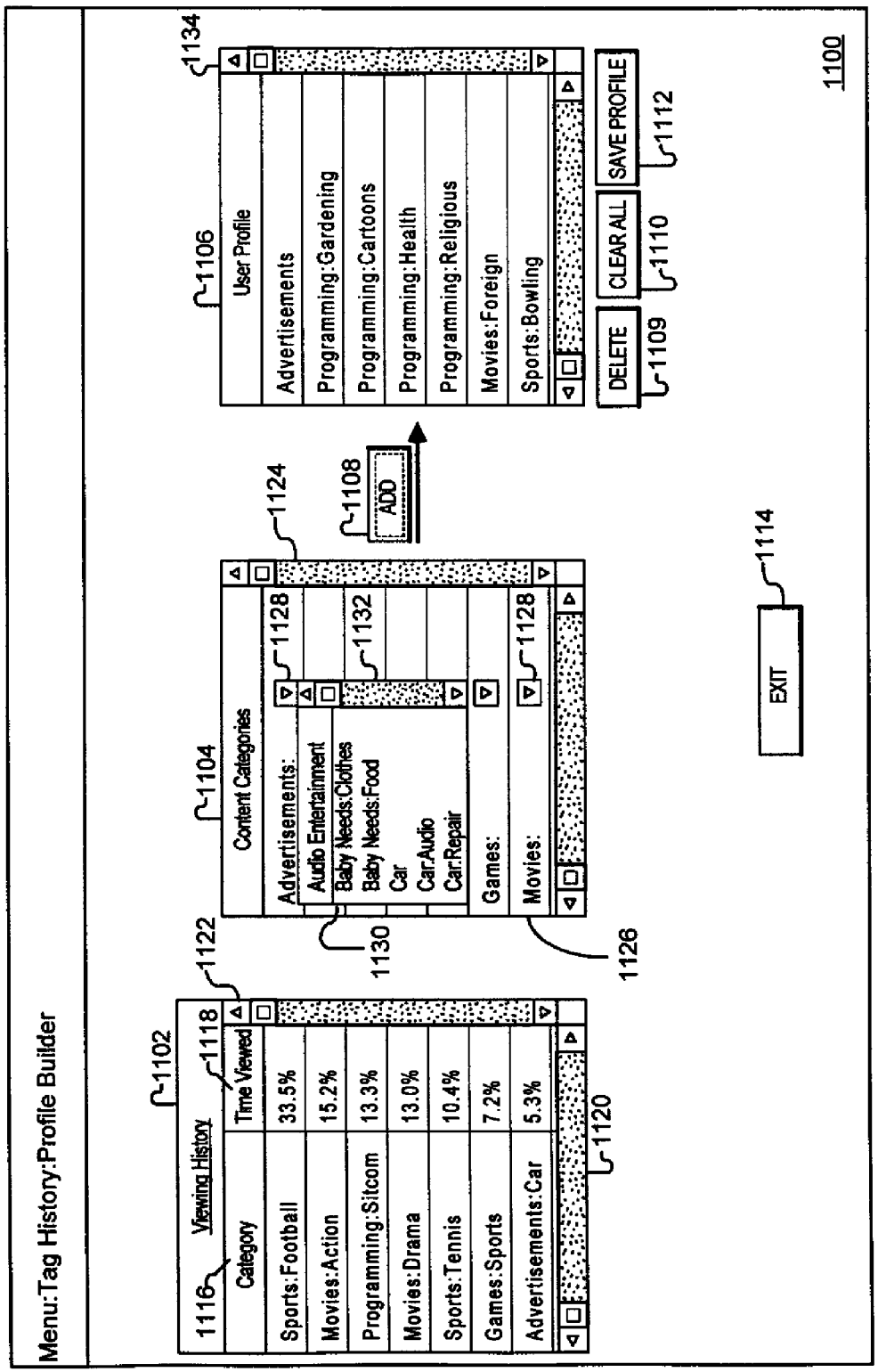
FIG. 11 illustrates a user interface that may be employed in an embodiment of the present invention to enable the user to edit a user profile in view of the user's viewing history.

As described above, the user can create a user profile based on the user's viewing history. A user interface 1100 is shown in FIG. 11 that provides a viewing history pane 1102, a categories pane 1104, and a user profile pane 1506. Via the user interface 1100, the user may view data about the user's viewing history in the viewing history pane 1102. Based on the viewing history data, the user may select content categories from the content categories pane 1104 to be blocked. To add categories to the user profile pane 1106, the user selects an "add" visual display element, such as an add button 1108.

The user may delete a selected category from the user profile pane 1106 using a "delete" visual display element, such as the delete button 1109. The user may also clear all categories from the user profile pane 1106 with a "clear" visual display element, such as the clear all button 1110. In addition, the user may save the categories in the user profile pane 1106 to the user profile in memory using a save visual display element, such as the save profile button 1112. After the user has created the user profile, the interface 1100 may be exited with an exit button 1114.

In the particular embodiment, the viewing history pane 1102 has two columns of data, a category column 1116 and a time viewed column 1118. The category column 1116 includes categories and subcategories of media content the user has viewed. The time viewed column 1118 provides viewing time data corresponding to each of the categories or subcategories in the category column 1116. The viewing time data may indicate viewing time in absolute time units (e.g., time in hours) or the viewing time data may indicate a relative amount of time spent viewing each of the corresponding categories or subcategories. For example, as illustrated, the subcategory football has been watched 33.5% of the time according to the viewing history. The viewing history pane 1102 includes selecting elements, such as a horizontal scroll bar 1120 and a vertical scroll bar 1122, that enable the user to scroll through the categories and frequencies.

The viewing time values shown in the time-viewed column 1118 may be determined using any method as may be known in the art. In one embodiment of the client device 304 (FIG. 3), the analysis module 314 calculates the time-viewed values. In this embodiment the content insertion engine 402 (FIG. 4) of the analysis module 314 monitors the categories and subcategories of content that are viewed. The content insertion engine 402 may include a timer device that monitors how long each item of content is viewed. Then, the content insertion engine 402 accumulates viewing time associated with each category and subcategory of content. On a substantially continuous basis, the content insertion engine 402 may calculate a time-viewed value for each category and subcategory. The time viewed value may be given on a percentage basis by dividing the total viewing time by the accumulated viewing time associated with each category and subcategory. The content insertion engine 402 saves the time-viewed values in memory. When the user views the interface 1100, each time-viewed value and associated category or subcategory is transmitted to the presentation module 403 via the blocking module 404, for presentation in the viewing history pane 1102.

The content categories pane 1104 is a list of all possible categories from which the user may select. The user may scroll through all categories using a scroll bar 1124. When the user identifies a category to be added to the user profile, such as advertisements, the user may select the advertisements category and then select the add button 1108 to add the category advertisements to the user profile pane 1106. In another embodiment, using a mouse input device, the user may double click a category or subcategory, such as advertisements, to add that category or subcategory to the user profile pane 1106. Each row 1126 in the content categories pane 1104 includes a drop down selector 1128.

When the user selects the drop down selector 1128, a drop down menu 1130 is presented with a list of subcategories associated with a higher-level category. The drop down menu 1130 includes vertical scroll bar 1132, whereby the user may scroll through the subcategories associated with the higher-level category. For example, under the higher level category 'advertisements,' a user may select the subcategory 'baby needs advertisements' for addition to the user profile pane 1106. As with higher-level categories, the user may add a subcategory to the user profile pane 1106 by selecting the subcategory and selecting the add button 1108, or by "double-clicking" on the subcategory.

As content categories are selected by the user and added to the user profile pane 1106, they appear in a row in the user profile pane 1106. The user may view all of these content categories or subcategories using selective visual display elements, such as a vertical scroll bar 1134 and a horizontal scroll bar 1136. If the user wants to remove a category or subcategory from the user profile pane 1106, the user may select the content category or subcategory and activate a delete button 1109. When the delete button 1109 is activated, a selected category or subcategory in the user profile pane 1106 is removed from the user profile pane 1106. If the user wishes to remove all categories and subcategories from the user profile pane 1106, the user may select the clear all button 1110, which removes all categories or subcategories from the user profile pane 1106.

When the user is satisfied with the categories or subcategories that are in the user profile pane 1106, the user may select the save profile button 1112 to save the categories and subcategories to the user profile. When the save profile button 1112 is selected, the content categories and subcategories identified in the user profile pane 1106 are encoded and/or formatted as necessary, and saved to a user profile in long-term memory to be used later for blocking undesired content. When the user is finished editing the user profile, the user may press an exit button 1114 to exit the profile builder interface 1100.

Figure 12:
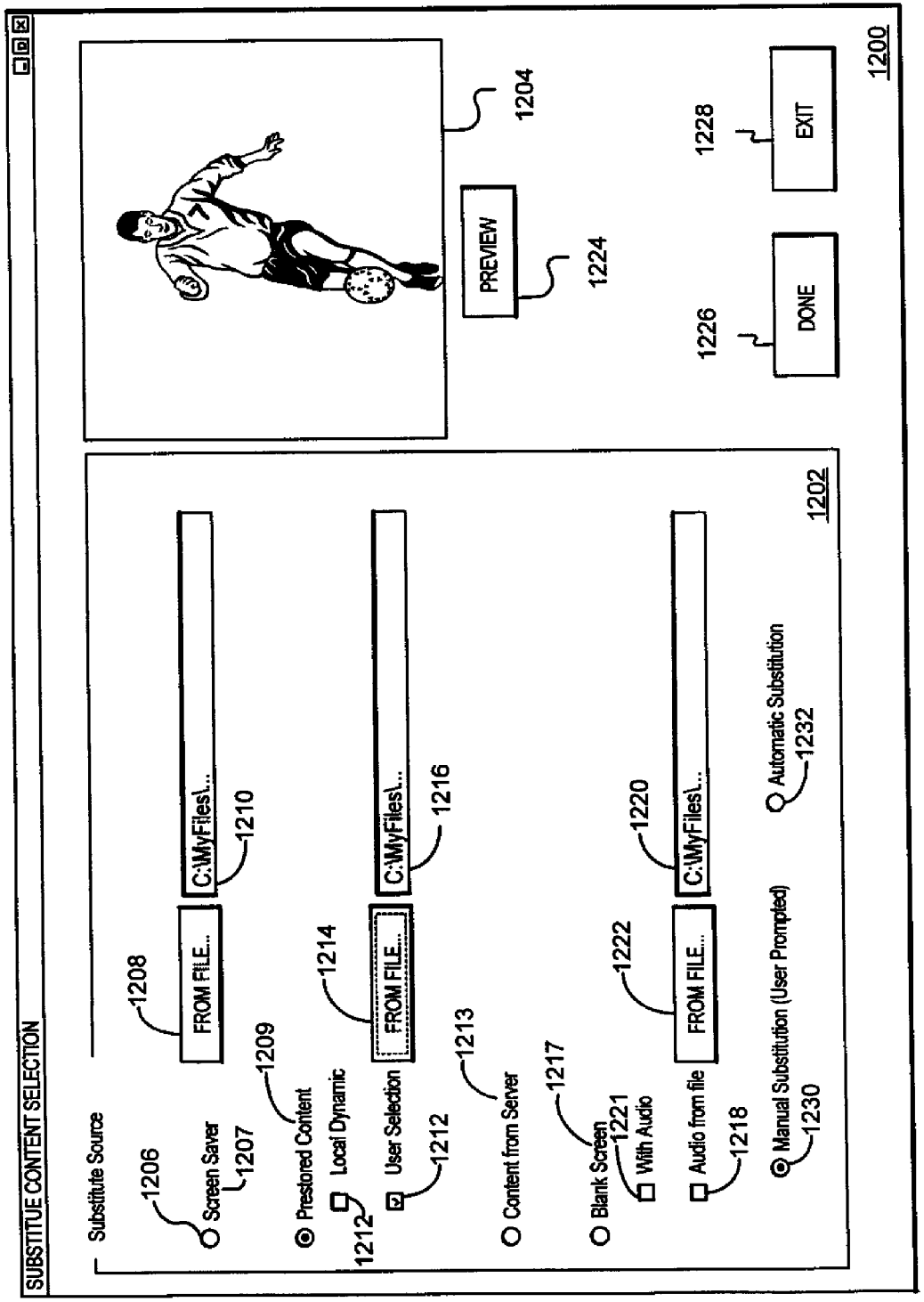
FIG. 12 illustrates a user interface that may be used to select substitute content for blocked content in one embodiment of the present invention.

A substitute content selection user interface 1200 is illustrated in FIG. 12. The substitute content selection user interface 1200 facilitates a user's selection of substitute content that may be used in place of content that is determined to be blocked. In general, the user interface 1200 enables a user to designate a substitution mode(s). More specifically, the substitute content user interface 1200 enables a user to select substitute content parameters, such as a source, type, and nature (e.g., dynamic or static) of the substitute content. A substitute content selection user interface may be graphical, textual, or relational as is suitable for the particular implementation. In general, the data entered via the substitute content user interface 1200 defines a substitution mode.

The particular embodiment illustrated in FIG. 12 of the substitute content user interface 1200, is graphical in nature. As illustrated, the substitute content user interface 1200 has a source area 1202 and a preview area 1204. The source area includes visual display elements, such as radio buttons 1206, which are mechanisms by which a user can select an associated source for substitute content. As illustrated, the user may select a screensaver selector 1207, a prestored content selector 1209, a content from server selector 1213, or a blank screen selector 1217.

A screensaver may be selected for substitution via the screensaver selector 1207. A screensaver source typically includes a file having screensaver data, such as one or more displayable images, or displayable image patterns. A file selector, such as the "from file" button 1208 facilitates selection of a screensaver file. The user may select the from file button 1208 using a selection device such as a mouse or remote control. Upon selection from the from file button 1208, the user is prompted to enter a file location and name, identifying the screen saver file. The file location and name is displayed in a screensaver file name field 1210.

Prestored content may be selected via the prestored content selector 1209. Prestored content includes content that may have been previously received by the client and stored locally, or a user selection of video or audio content. If the user selects prestored content, the user may then select a type of content, either local dynamic content or a user selection. A user may select the type of prestored content with a check box 1212 next to the desired type of content. If the user selects a user selection, the user may identify a file having the user selection with a "from file" button 1214. Upon selection from the from file button 1214, the user is prompted to enter a file location and name identifying the user selection. The location and name of the file is displayed in a prestored content user selection field 1216.

A 'content from server' selector 1213 may be provided to enable the user to select content from the server. If the user selects content from server, when content is received that would otherwise be presented but for the fact that the tags indicate the content should be blocked, the client device identifies other content from the server that is in accord with the user profile. Selecting other content from the server by the client device may involve requesting alternative content to replace the blocked content, or, in another embodiment, identifying other content streaming from the server to the client that is appropriate. In the latter case, the server may provide many potential substitute data streams, each having descriptive tag values. If the default content stream is blocked, the next one is analyzed, and so on, until one is not blocked and is presented to the user. Consequently, the client device may recognize multiple items of content that are to be blocked, and in response to each blocking determination, attempt to identify content from the server that is appropriate using operations described herein.

As illustrated, the user may select a blank screen to substitute content selection by selecting an associated "blank screen" selector 1217. If the blank screen substitute content selector 1217 is selected, when the client determines that content should be blocked, a blank screen will be displayed. The user may also choose to have audio in combination with a blank screen. If the user selects an audio check box 1221, audio will be presented along with the blank screen when blocked content is identified. When the audio check box 1221 is selected, audio from the server is not blocked but is presented along with the blank screen. In other words, selection of blank screen selector 1217 and audio check box 1221 results in only the video being blocked but not the audio.

In another embodiment, the blank screen selector 1217 may be selected along with an "audio from file" check box 1218. In this embodiment, the audio that is presented to the user is from an audio source file identified in an audio source file field 1220. The audio source file field 1220 is chosen by the user via a "from file" button 1222 whereby the user may select the location and file name of the audio file to be presented along with the blank screen.

A manual input selector, such as the manual input radio button 1230, may be provided in an embodiment. Using the manual input radio button 1230, the user indicates that the user should be prompted before content is substituted for blocked content. As is discussed with reference to FIG. 18, the user may be prompted with a list of preferred content, from which the user can select for substitution.

Figure 16:
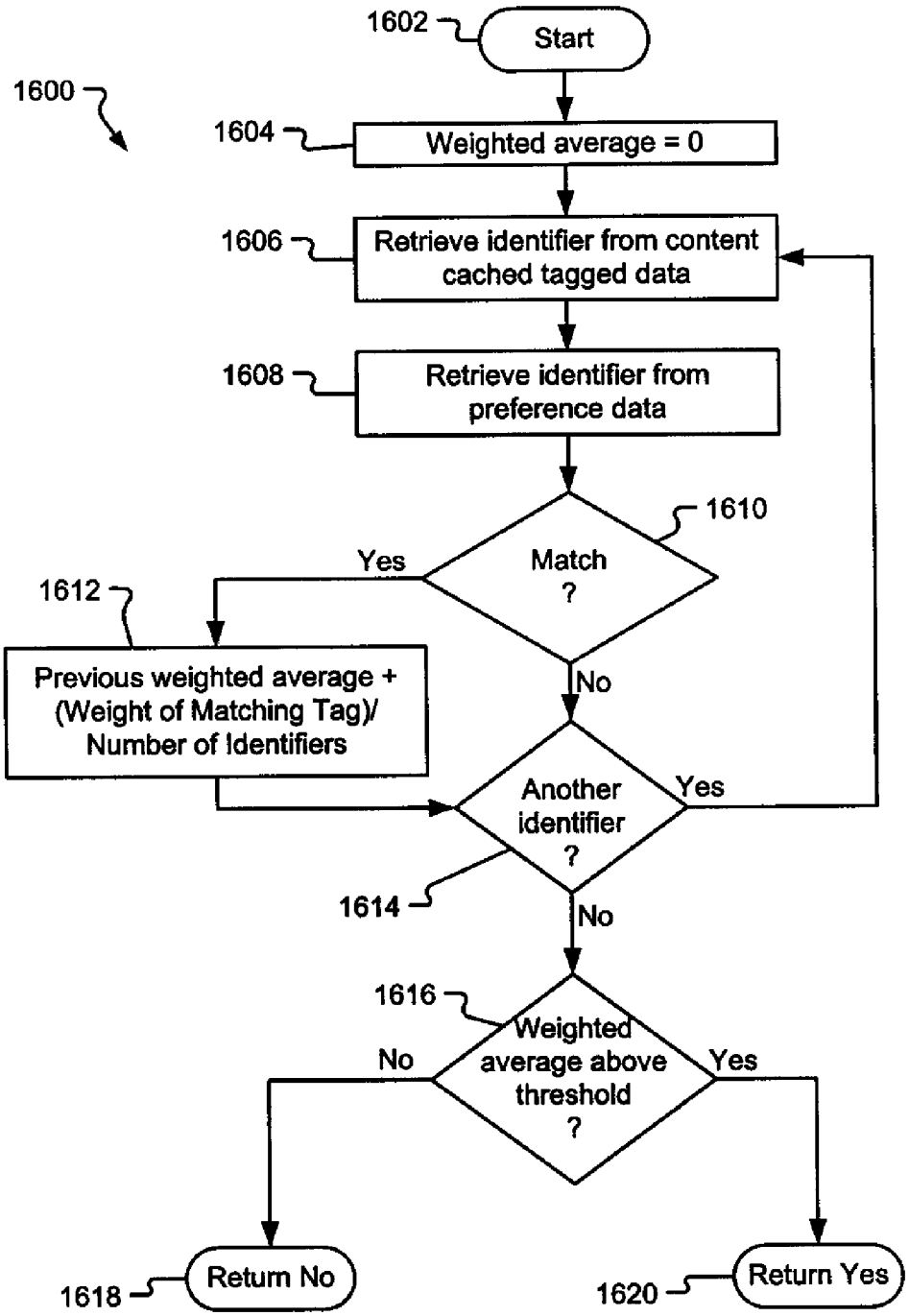
FIG. 16 is an operational flow diagram illustrating exemplary operations for correlating two tags in accordance with an embodiment of the present invention.
Figure 17:
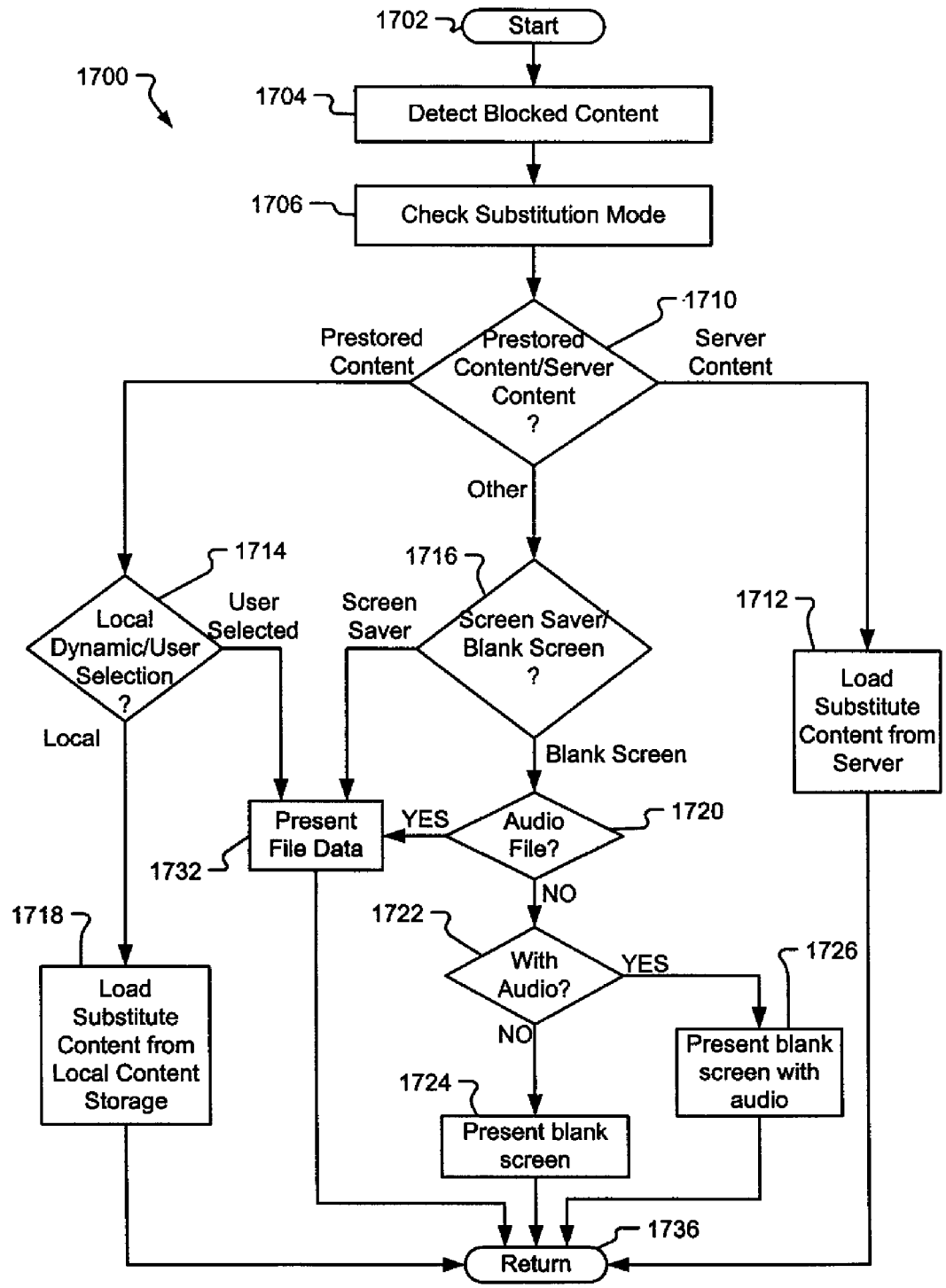
FIG. 17 is an operational flow diagram illustrating exemplary operations for selecting a source for substitute content and presenting the substitute content in accordance with an embodiment to the present invention.
Figure 18:
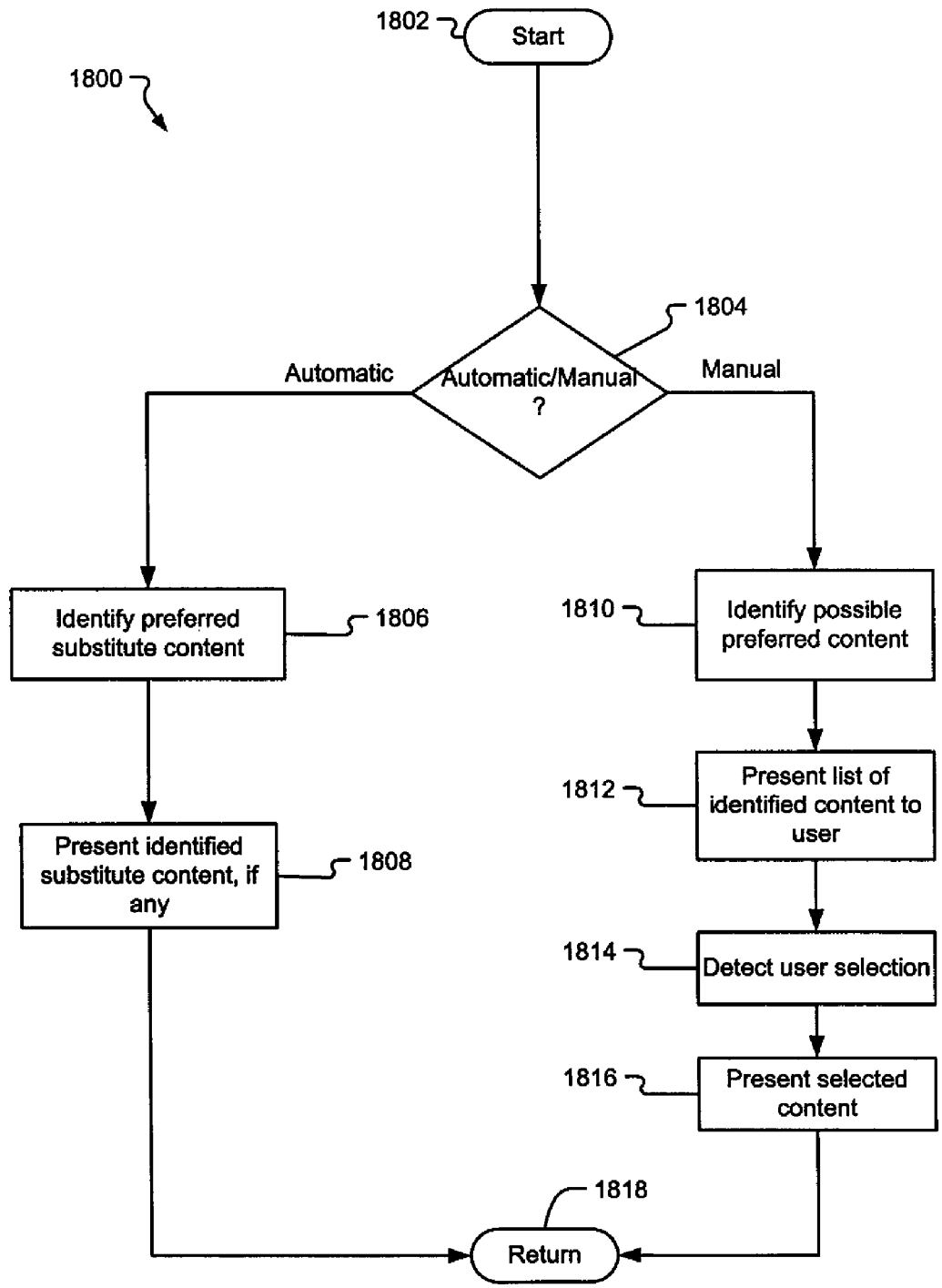
FIG. 18 is an operational flow diagram illustrating exemplary operations for choosing automatic or manual substitution in accordance with an embodiment of the present invention.

An automatic input selector, such as the automatic radio button 1232, may be provided in an embodiment. By selecting the automatic radio button 1232, the user indicates that substitution of content should be performed automatically and the user should not be prompted prior to substitution. Automatic substitution may be carried out using any methods as may be known, and particular embodiments are illustrated in FIGS. 16-18. As is discussed with reference to FIGS. 16-18, automatic substitution may involve correlation processes with dynamically updated or manually input preference data, based on tag field data, including tag field weighting data.

The preview area 1204 displays a preview of the selected substitute content. A preview display element, such as a preview button 1224, enables a user to turn on a preview function whereby the substitute source content is accessed and displayed in the preview area 1204. The preview area 1204 may be dynamically updated or, alternatively, the area 1204 may display a static snapshot of the substitute content. Two selectable display elements, a done button 1226 and an exit button 1228 enable the user to exit the user interface 1200. When the user selects the done button 1226, the settings that the user has entered on the user interface 1200 are saved to be used later and the user interface 1200 is exited. If the exit button 1228 is selected, the user interface 1200 is exited without saving the settings.

Screensaver content includes, but is not limited to, still frame scenes, or favorite photographs, such as family photos. Audio content that may be selected include, but is not limited to, music that has been loaded into the client device. Audio content may also include the audio received from the server. Thus, for example, when blank screen has been selected, the user may select that the audio continue to be presented to the user even though the video is not.

In an embodiment, the client device substitutes blocked content with other content that is substantially equal in duration. Thus, for example, if a 30-second advertisement is blocked, the client device identifies and presents substitute content that is also approximately 30 seconds in duration. Similarly if, for example, a 30-minute program is blocked, substitute content is selected that has approximately a 30-minute duration. Substitute can include more than one item of content in order to substantially equal the duration of the blocked content. Thus, for example, in one embodiment, if a two-hour movie is blocked, a combination of programs may be selected to substitute for the blocked movie such that combined duration of the substituted programs is two hours.

If the user selects substituted content from the server, in one embodiment the client device calls one or more servers to request additional content from the server. The client may inform the servers of the timed duration required to fill the time period of blocked content. In an alternative embodiment, the client device notifies servers of a need for alternative content, and in response, the servers provide real time data streams to the client device based upon predetermined user identified preferences.

Figure 13:
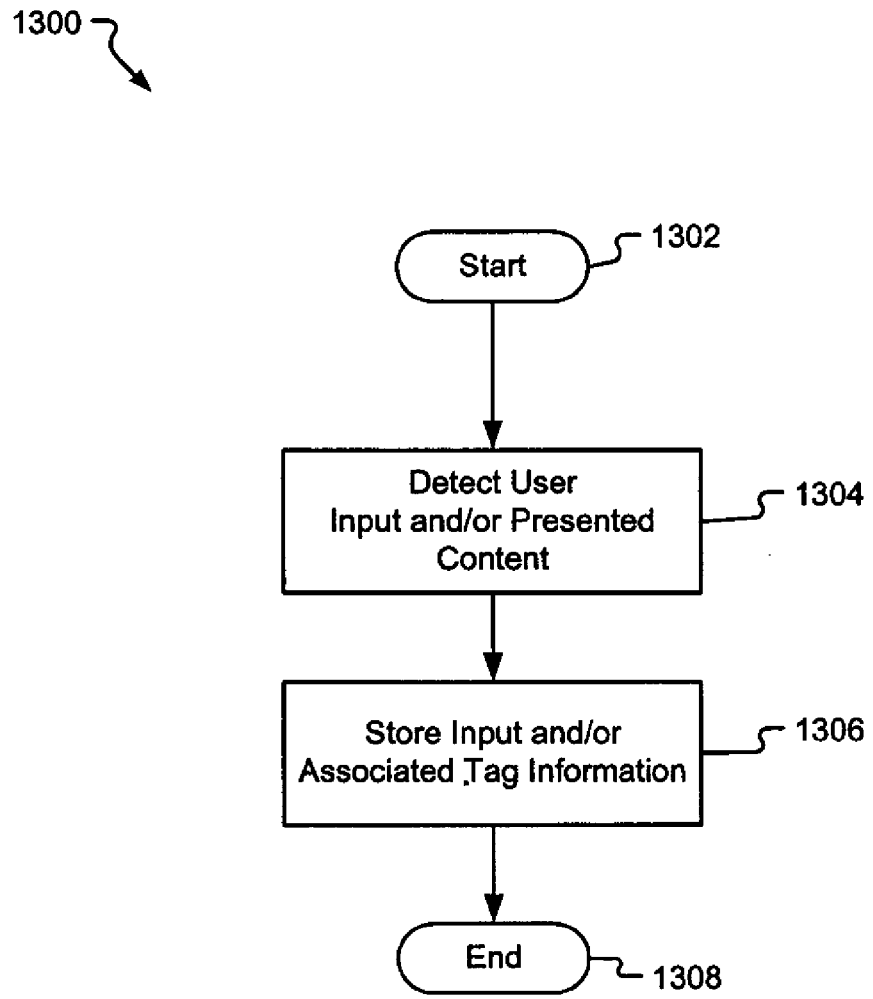
FIG. 13 is an operational flow diagram illustrating exemplary operations for gathering preferred content data in accordance with an embodiment of the present invention.

A preference data storage operation flow 1300 is illustrated in FIG. 13. The operation flow 1300 is employed in an embodiment of the present invention to store tags or other relevant data associated with content that is presented to the user so that local content may be used to substitute for any content that is blocked. Operation flow 1300 begins with start operation 1302. Then, while the client device is receiving tagged content, a detect operation 1304 detects which of the tagged content is presented to the user, as well as user input. The detect operation 1304 may detect any selections, such as, but not limited to, mouse clicks, keyboard entry, or remote control data entry.

The detect operation 1304 may record the user selections along with other related information such as time of entry, or duration of view particular content. For example, in a set-top box implementation, the detect operation 1304 may detect a user selecting a Home Box Office® (HBO®) movie "Band of Brothers"®. The detect operation 1304 records when the user begins watching "Band of Brothers"® as well as when the user changes the channel to another channel, such as a football game on CBS®. The collection, over time, of viewing patterns and preferences builds a user profile indicating the relative interest in different genres of content programming, such as sports, movies, dramas, education, children, etc. Multiple levels of detail (e.g., subtypes) can be derived, such as specific types of sports.

After the detect operation 1304 detects presented content and/or one or more user selections, a store operation 1306 stores user selection data and/or tag data associated with presented content. As discussed, all media content, including programming, from a server device includes a tag(s) descriptive of content. The tag data and/or user input data may be stored for analysis, such as determining a pattern in the user's selections and automatically identifying and substituting preferred content with blocked content. In a particular embodiment, the user input and tag data are stored in the preference storage 405 (FIG. 4). In an embodiment, the detect operation 1304 and the store operation 1306 may be iterated indefinitely until the user turns off the client device 304. Alternatively, the detect operation 1304 and the store operation 1306 may iterate for a predetermined time period.

Figure 14:
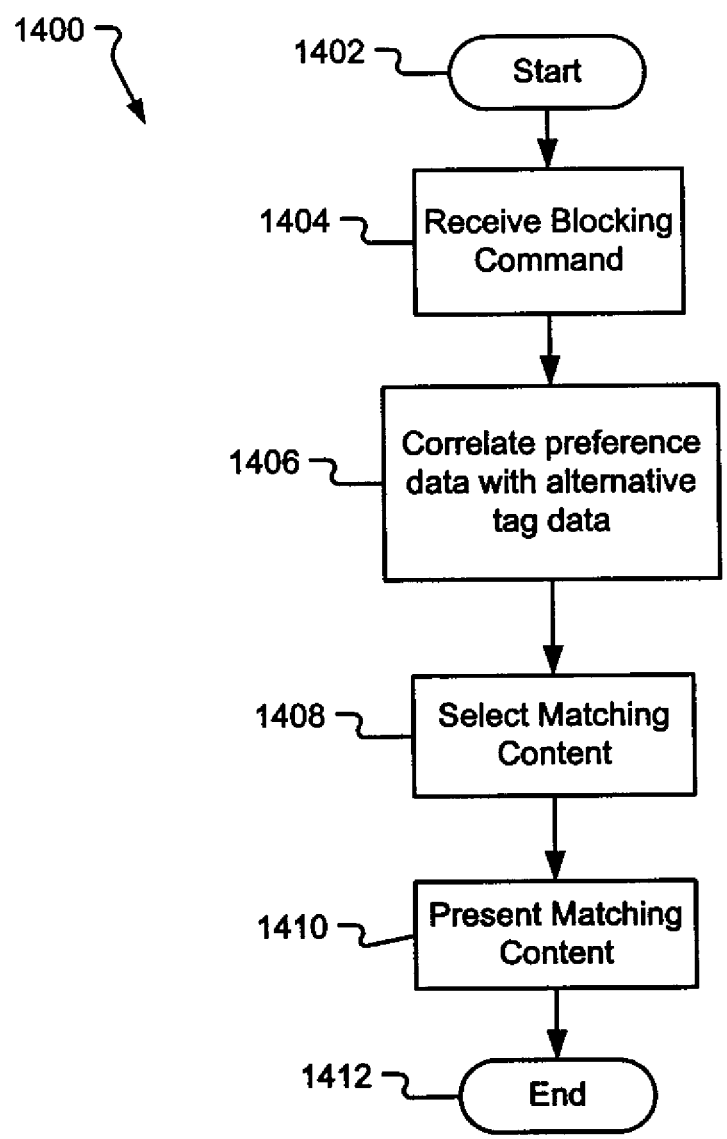
FIG. 14 is an operation flow diagram illustrating exemplary operations for substituting content in place of blocked content in accordance with an embodiment of the present invention.

FIG. 14 is a flow diagram 1400 illustrating exemplary steps or operations that may be implemented by the block module 404 to block media content received from the server device that is not desired by the user and present substitute content in place of the blocked content. After a start operation 1402, a receive operation 1404 receives a command to block media content from presentation. A correlate operation 1406 then correlates tags in the preference data 405 with tags for alternative content. The alternative tag data may be obtained from prestored content (e.g., storage module 316 in FIG. 3) or the server to determine which tagged data from the storage module 316 may be most preferred by the user. In the correlate operation 1406 it is determined whether alternative tags from an alternative content source are similar to tags in the preference data 405.

In one embodiment, the correlate operation 1406 may determine a level of correlation or matching for each data stream in the storage module 316. For example, the correlate operation 1406 may determine that two tags sufficiently match if at least three fields in the tags are the same, even if some other fields are different between the tags. If the level of matching is above a predetermined threshold, the data stream may be presented to the user. Of course, other criteria may be established in order to select and present content.

A select operation 1408 then selects the media content that most closely matches the preference data 405. If the blocking command received in the receive operation 1404 is an advertisement blocking command, the select operation 1408 preferably selects an alternative tag for an advertisement from either the storage module 316 or the server to substitute in place of the blocked advertisement. If more than one advertisement sufficiently matches a tag in the preference data 405, the select operation 1408 may select an advertisement that has not been presented to the user recently (e.g., from the client tagged data 316 in FIG. 3). In a present operation 1410 the selected substitute content is presented to the user. In one embodiment, the present operation 1410 notifies the user I/O module 318 of the substitute media content to be presented to the user that was selected in the select operation 1408.

Figure 15:
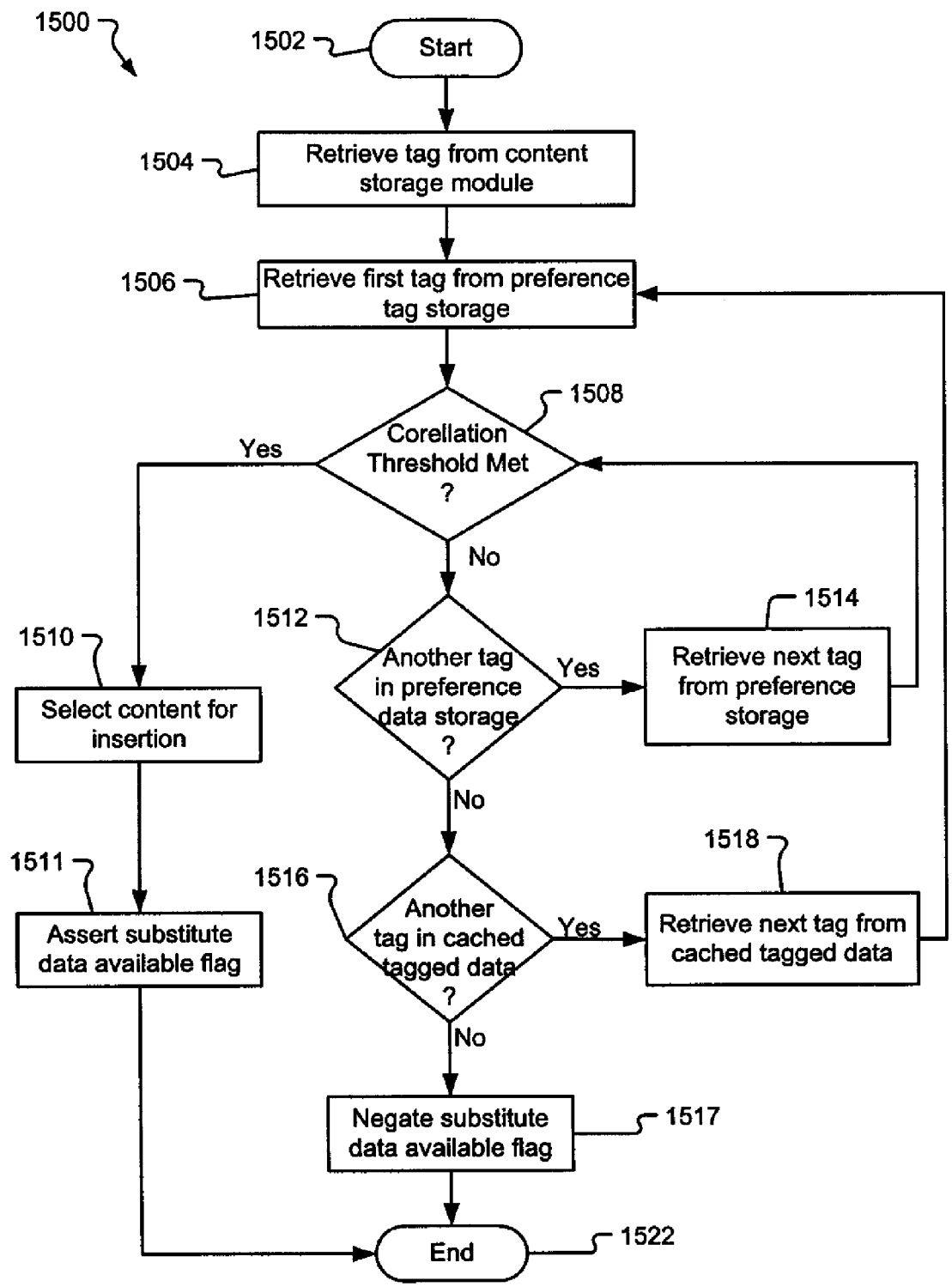
FIG. 15 is an operational flow diagram illustrating exemplary operations for dynamically identifying preferred substitute content in accordance with an embodiment of the present invention.

FIG. 15 illustrates an embodiment of a substitute content identification operation flow 1500. Upon receipt of a blocking event, one or more content items are dynamically identified that may be substituted for the blocked content. In a retrieve operation 1504, a tag is retrieved from client storage (e.g., client tagged data 316) or the server. In another retrieve operation 1506 a tag is retrieved out of the preference data storage 405. In a correlate operation 1508, the dynamic content tag (from the retrieve operation 1504) is compared to the preferred tag (retrieved in the retrieve operation 1506) to determine if the two tags meet a predetermined correlation threshold. Comparing the two tags may be accomplished using any method as may be known in the art and may depend on how the tags are encoded in the particular implementation.

If it is determined that the two tags retrieved in operations 1504 and 1506 meet the predetermined correlation threshold, the tag retrieved from the preference data storage module 405 is selected in a select operation 1510. In the select operation 1510, the content associated with the selected tag is retrieved from the tagged data storage 316 and made available for presentation. However, if the two tags compared in the compare operation 1510 do not meet the predetermined correlation threshold, a determine operation 1512 determines if another tag is available for comparison. If so, the next tag is retrieved from the content preference data in a retrieve operation 1514. After the next tag is retrieved from the preference data, the correlate operation 1508 compares the next preferred content tag with the tag retrieved from the tagged data 316.

If, on the other hand, it is determined that no other tags are in the preference data, operation flow 1500 branches NO to a determine operation 1516. The determine operation 1516 determines whether another tag exists in the tagged data memory 316 for comparison. In the determine operation 1526, the blocking module 404 may request another tag from the tag data memory 316. If another tag is identified in the tagged data memory 316, the next tag is retrieved in a retrieve operation 1518. After the next tag is retrieved, operation flow 1500 returns to the retrieve operation 1506 wherein the first tag in the preferred data storage 405 is again retrieved, and the sequence of comparison and retrieval begins again.

If it is determined that no more tags are available in the tagged data memory 316 in the determine operation 1516, a negate operation 1517 negates an availability flag, or other indicator, which indicates that content has not been selected for substitution in place of blocked content. After appropriate content is selected in the selecting operation 1510, a assert operation 1511 asserts the availability flag, or other indicator, which indicates that content has been selected for substitution in place of blocked content. After the assert and negate operations 1511 and 1517, the operation flow 1500 ends at end operation 1522. If the operation flow 1500 ends with the availability flag being negated (i.e., no content meets the correlation threshold), a message may be presented to the user indicating that no substitute content is available for presentation.

FIG. 16 illustrates an operation flow 1600 with exemplary operations that may be employed in an embodiment of the correlate operation 1508 of FIG. 15. Input to the operation flow 1600 is a tag from the tagged content memory 316 and a tag from the preference data 405. In general, the operational flow 1600 of FIG. 16 iterates through fields in the two input tags, determining if one or more of the category data fields for the tags matches. After all the fields are iterated through, a score is generated that may be used to rank the tag in terms of user preference and/or substitute the associated content in place of blocked content. In an initialize operation 1604, a weighted average value is set equal to zero. The weighted average value is used to keep track of the score associated with the tag.

In a retrieve operation 1606, a field (e.g., type field 516 of FIG. 5) and its category data (e.g., "Game") is retrieved from the tag from the tagged data memory 316. In another retrieve operation 1608, an associated type identifier and its identifying data are retrieved from the user profile tag. In a compare operation 1610 it is determined whether the category data for the two associated fields match. For example, if the type identifying data is "Game" in both the tags, the fields match. When the identifier data matches, a score operation 1612 accumulates a running score associated with the tag from the tagged data memory 316. In one embodiment, the score operation 1612 calculates a weighted average of the category fields.

If, in the compare operation 1610, the category field of the tagged data memory tag does not match that of the user profile tag, and after the score operation 1612, a determine operation 1614 determines if another field remains in the tags to be compared. If another field (e.g., title field 518 of FIG. 5) remains for comparison, the retrieve operation 1606 retrieves the field and its category data from the tagged data memory tag. Processing continues as before to compare the corresponding field of the preference data tag. If no more fields remain to be processed in the determine operation 1614, another determine operation 1616 determines if the score computed in the score operation 1612 is above a predetermined threshold value.

If the score is not above the predetermined threshold value, a return 'NO' operation 1618 returns an indicator that the tag from the tagged data memory 316 is not sufficiently correlated to the preferred tag. If the score is above the predetermined threshold value, a return 'YES' operation 1620 returns an indication that the tag from the tagged data memory 316 is sufficiently correlated to the preferred tag. In both the return operations 1618 and 1620, the score may be returned along with the indicator. The score may be used by a calling module to sort tagged data memory tags according to preference and/or substitute content.

An operation flow 1700 is illustrated in FIG. 17 having exemplary operations for choosing a source of substitute content and presenting the substitute content in place of blocked content. In general, the operation flow 1700 checks settings that were set by a user via a user interface, such as the substitute selection user interface 1200 (FIG. 12). Based on settings via the substitute selection interface 1200, in one embodiment, flags or other indicators are stored indicating the user selections. The flags or indicators are used in the operation flow 1700 to choose substitute content based on the user's selections.

After a start operation 1702, a detect operation 1704 detects blocked content. Detecting blocked content, as discussed above, includes receiving content from a server or similar device, and comparing tags from the received content with tags in a user profile. If a tag from received content matches tags in a user profile, then the content is blocked. After blocked content is detected in the detect operation 1704, a checking operation 1706 checks a substitution mode. The check operation 1706 checks flags or variables or other data that was stored previously based on selections made in the user interface 1200. After the check operation 1700, a determine operation 1710 determines whether the substitution mode is prestored content, server content, or other content. If it is determined that the substitution mode is server content, the operation flow 1700 branches to a load operation 1712. The load operation 1712 loads substitute content from the server.

If the determine operation 1710 determines that the substitution mode is prestored content, the operation flow 1700 branches to another determine operation 1714. The determine operation 1714 determines whether the selected prestored content is local dynamic content or user selected content. If the determine operation 1710 determines that the substitution mode is neither prestored content nor server content, the operation flow 1700 branches to another determine operation 1716. The determine operation 1716 determines whether the substitution source is a screen saver or a blank screen.

With regard to the determine operation 1714, if it is determined that local dynamic content was selected for substitution, a load operation 1718 loads substituted content from local content storage. If, on the other hand, the determine operation 1714 determines that user selected content is to be used, a present operation 1732 presents user selected data from a predetermined file. The present operation 1732 presents content from a user-selected. As discussed, the user selected file data may include content of any type that the user desires to switch to in the case that blocked content is received.

With regard to the determine operation 1716, if it is determined that a screen saver has been selected as the substitution source, operation flow 1700 branches to the present operation 1732. The present operation 1732 then presents a screen saver stored in a screen saver file. If the determine operation 1716 determines that a blank screen has been selected, another determine operation 1720 determines whether an audio file has been selected for use during content substitution. If the determine operation 1720 determines that an audio file is to be used during substitution, the present operation 1732 presents the audio from the selected audio file with a blank screen.

If the determine operation 1720 determines that an audio file is not to be used during substitution, operation flow 1700 branches NO to another determine operation 1722. The determine operation 1722 determines whether a blank screen is to be presented with streaming audio, or if no audio is to be presented. If the determine operation 1722 determines that audio is to be presented with the blank screen, operation flow 1700 branches YES to a present operation 1726. The present operation 1726 presents a blank screen to the user with streaming audio (i.e., audio is not blocked).

If the determine operation 1722 determines that audio is to be blocked during presentation of the blank screen, operation flow 1700 branches NO to a presenting operation 1724. The present operation 1724 presents a blank screen with no audio (i.e., audio is blocked). After the load operation 1718, the present operation 1732, the present operation 1724, the present operation 1726, and the load operation 1712, the operation flow 1700 ends at a return operation 1736.

An operation flow diagram 1800 is illustrated in FIG. 18 including operations for choosing between automatic and manual substitution that may be employed in an embodiment of load operations 1718 and 1712 (FIG. 17). As discussed in FIG. 12, the user can select between manual (user prompted) or automatic selection of substitute content when it is determined that blocked content has been received. When content is to be loaded from the server or locally at the client for substitution, particular substitute content may be automatically identified and presented to the user or the user may be provided a list of content items to choose from for substitution.

After a start operation 1802, a determining operation 1804 determines whether substitute content is to be automatically or manually selected. In one embodiment, the determine operation 1804 checks a flag, or other indicator, that was previously set. If it is determined that the substitute content is to be automatically selected, the operation flow 1800 branches to an identify operation 1806 wherein preferred substitute content is automatically identified. The identify operation 1806 in one embodiment employs correlation according to embodiments described herein to identify preferred content.

The identify operation 1806 may calculate a level of preference and identify the most preferred content item for substitution. A present operation 1808 presents the preferred substitute content that was identified in identify operation 1806. In one embodiment, the preferred substitute content that is identified is selected to correspond with the time duration of the content that is blocked.

If it is determined in the determine operation 1804 that substitute content is to be manually selected, the operation flow 1800 branches to an identify operation 1810 wherein one or more preferred content items are identified. Again, in one embodiment, the identify operation 1810 utilizes correlation to correlate tags associated with content items to identify preferred content items. Present operation 1812 then presents a list of identified content items to the user.

In one embodiment, the present operation 1812 presents descriptive information for each of the possible preferred content items and enables the user to select among the content items. A detect operation 1814 detects user selection of one or more of the content items for substitution in place of the blocked content. In response to detecting a user selection, a present operation 1816 presents the selected content to the user. The present operation 1816 locates the selected content in local storage or from the server loads the selected content into memory as necessary and presents it to the user. After the present operation 1808 and the present operation 1816, the operation flow 1800 ends at return operation 1818.

After content has been blocked, via user selection, content substitution, or otherwise, a user of the client device may want to be presented content after the blocked content has ended. Embodiments described with respect to FIGS. 19-22 incorporate unique methods and systems via which blocked content may be monitored and alternative content may be selected and/or presented after blocked content has terminated. More specifically, a user may automatically be presented content upon termination of blocked content, or the user may be notified upon termination of the blocked content. If the user is notified of termination of the blocked content, the user may acknowledge the notification and may further be prompted to select content to switch to after the blocked content ends.

Figure 19:
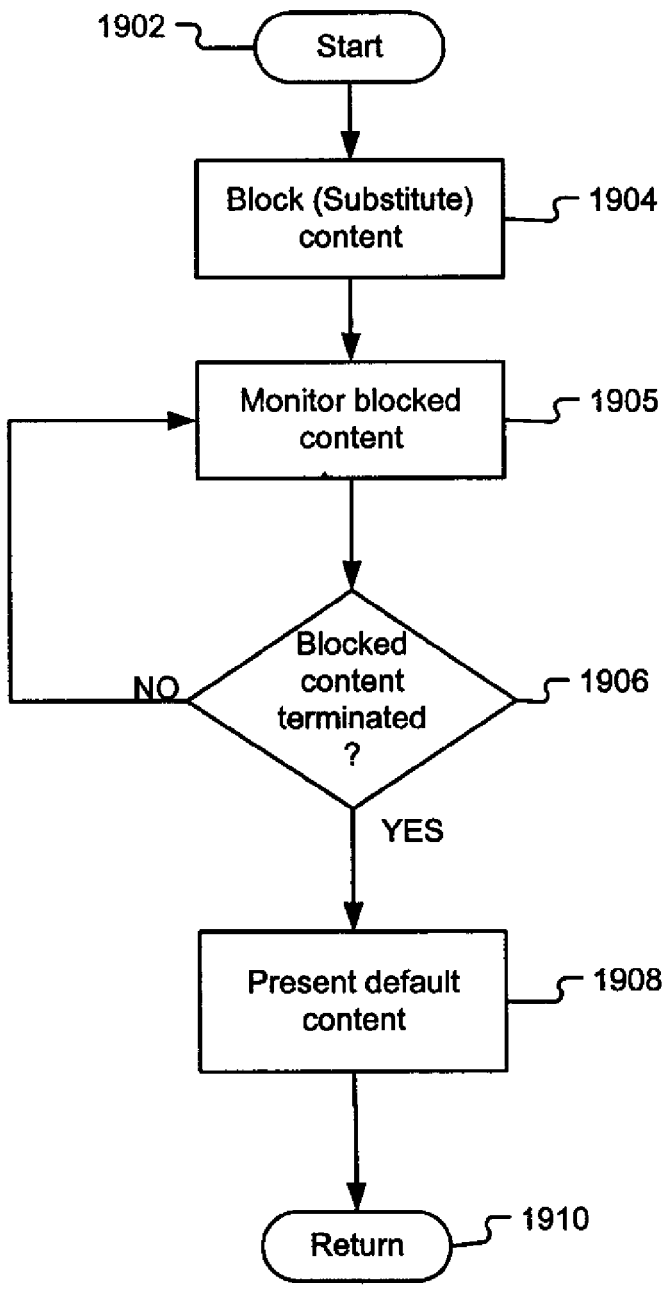
FIG. 19 is an operational flow diagram illustrating exemplary operations for switching to default content when blocked content ends.

An operation flow 1900 is illustrated in FIG. 19, having operations for presenting default content after blocked content has terminated. After a start operation 1902, a block operation 1904 blocks unwanted content. In one embodiment, the block operation 1904 presents substitute content in place of the blocked content, as in embodiments described in more detail above. After the block operation 1904 blocks the unwanted content, a monitor operation 1905 monitors the blocked content to determine when the blocked content will terminate. Next, a query operation 1906 queries whether the blocked content has terminated. Thus, for example, if the blocked content is in advertisement, the query operation 1906 determines whether the blocked advertisement has ended. If the query operation 1906 determines that the block content has not ended, operation flow 1900 branches NO to the monitor operation 1905.

If, on the other hand, the query operation 1906 determines that the block content has ended, the operation flow 1900 branches YES to a present operation 1908. The present operation 1908 automatically presents default content. In one embodiment of the operation flow 1900, the default content of the present operation 1908 is based on settings previously made by the user or manufacturer settings. For example, default content may simply be the content that was being presented prior to the blocked content. In this example, the present operation 1908 returns to the content that was being presented prior to the blocked content. In another embodiment, the default content in the present operation 1908 may refer to other content that the user sets up during initialization of the client device. After the present operation 1908, the operation flow 1900 ends at return operation 1910.

Figure 20:
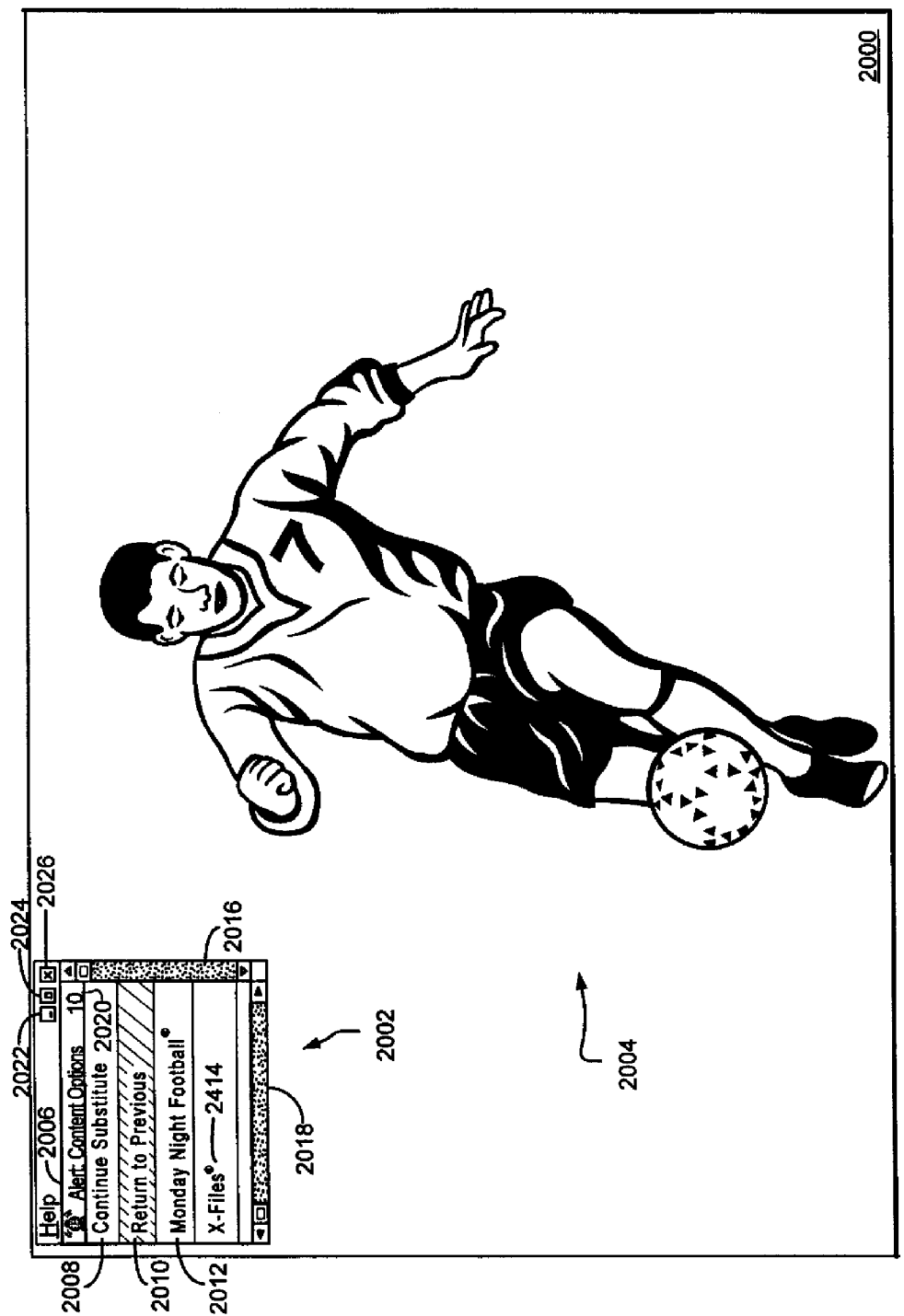
FIG. 20 is an exemplary screen shot of substitute content being presented and a termination notification that enables a user to choose among possible content upon termination of blocked content.

A blocked content termination notification is illustrated in FIG. 20 in accordance with one embodiment of the present invention. A pop-up menu 2002 is one type of termination notification that alerts a user of the client device that blocked content has terminated or will imminently terminate. Other types of termination notifications are icons, scripts, audible tones, audible announcements, or any combination of these. In general, a termination notification may be any notice to the user that blocked content has terminated or will terminate shortly. In an alternative embodiment, the user may be notified when desired content is beginning after the blocked content.

In the particular embodiment shown in FIG. 20, the pop-up menu 2002 is displayed in conjunction with substitute content 2404. Thus, while the substitute content 2004 is being presented, the pop-up menu 2002 pops up in the display area 2000. The pop-up menu 2002 includes a list of content options 2006 from which a user may select. The list of content options 2006 enables the user to choose content to switch to after the blocked content has terminated. As illustrated, examples of content options that may appear in the list 2006 are a continue substitute option 2008, a return to previous option 2010, a "Monday Night Football®" option 2012, in "X-files®" option 2014, etc. The user may use a vertical scroll bar 2016 or a horizontal scroll bar 2018 to view more options in the content options list 2006. In one embodiment, the user may select an option in the list 2006 by clicking on the option with a mouse or similar input device.

If the user selects the continue substitute option 2008, the substitute content 2004 will continue to be presented after the blocked content has ended. If the user chooses the return to previous option 2010, the content that was being shown prior to the blocked content will be returned to when the blocked content ends. If the user selects the "Monday Night Football®" option 2012, the "Monday Night Football®" game will be switched to upon termination of the blocked content. Likewise, if the "X-files®" option 2014 is selected, the "X-files®" program will be switched to after the termination of the blocked content. Options such as "Monday Night Football®", "X-files®", and the like, may be presented to the user based on the user profile discussed previously and the user's viewing habits using methods discussed previously with regard to identifying more or less preferred content.

The pop-up window 2002 includes a counter 2020 that indicates how much time remains until the blocked content ends. In one embodiment, the counter 2020 decrements by one every second. In one embodiment, when the counter 2020 reaches 0, the client device switches to a predetermined default content, such as the previous content or the substitute content. In another embodiment, when the counter 2020 reaches 0, the client device switches to the content option that is highlighted in the content options list 2006.

In an embodiment, the user may remove, minimize, or maximize a termination notification. In accordance with this particular embodiment, as illustrated in FIG. 20, the pop-up menu 2002 includes three visual display elements, a minimize icon 2022, a maximize icon 2024, and a hide icon 2026, for minimizing, maximizing and removing the pop-up menu 2002, respectively.

Figure 21:
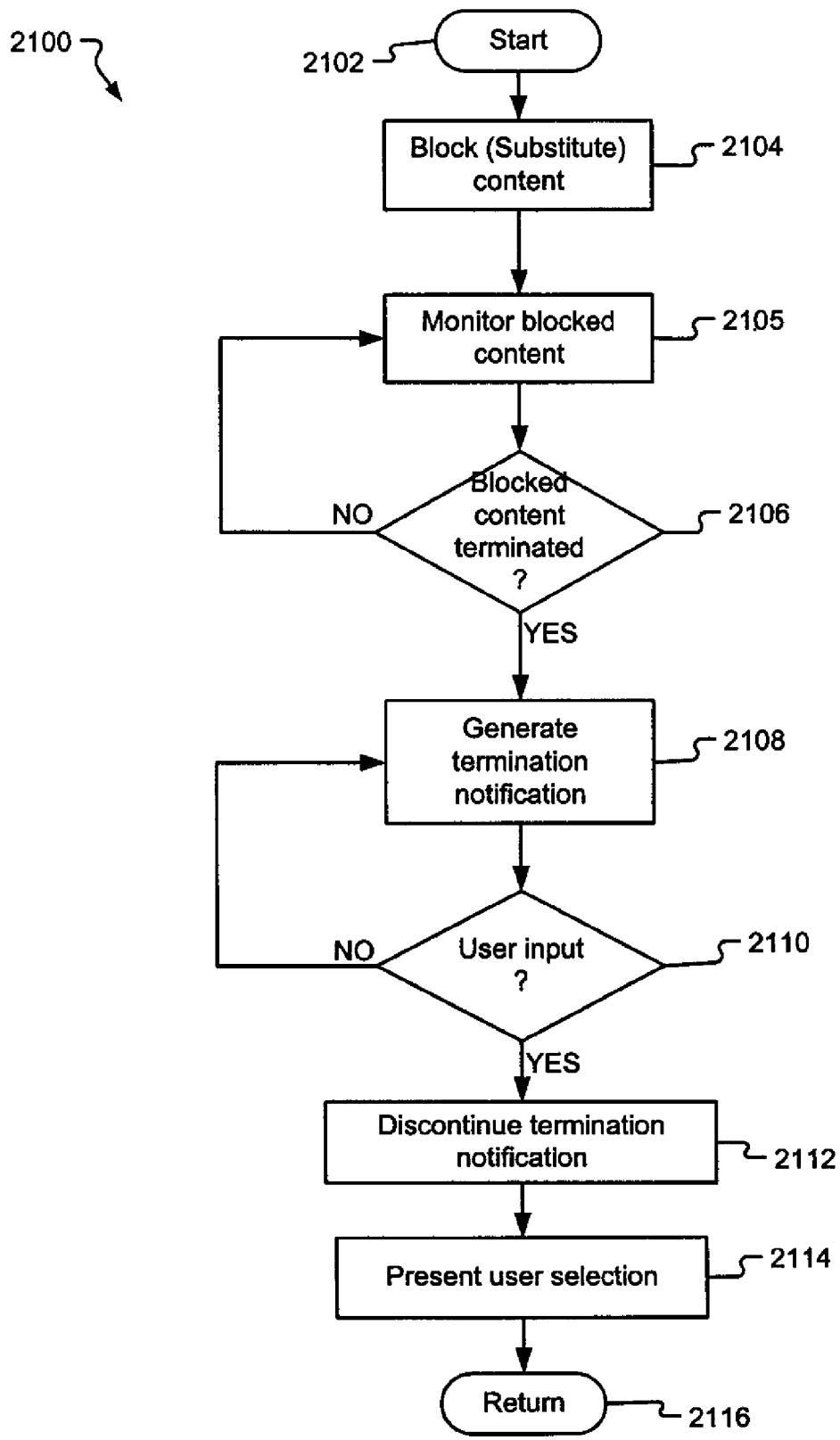
FIG. 21 is an operational flow diagram illustrating exemplary operations for notifying a user of blocked content termination and detecting user acknowledgment.

An operation flow 2100 that may be used to notify a user of termination of blocked content and choose content after termination of blocked content is shown in FIG. 21. The embodiment illustrated in FIG. 21 may be advantageously used in conjunction with a termination notification such as the pop-up menu 2002 shown in FIG. 20.

After a start operation 2102, a block operation 2104 blocks unwanted content. The block operation 2104 may block the unwanted content by presenting substitute content in place of the blocked content using any method of substitution as may be known in the art, including embodiments described above. After the block operation 2104, a monitor operation 2105 monitors the blocked content to determine when the blocked content will terminate. A query operation 2106 then queries whether the blocked content has terminated. If the blocked content has not terminated, the operation flow 2100 branches NO to the monitor operation 2105, which continues to monitor the blocked content. If the query operation 2106 determines that the blocked content has terminated, the operation flow 2100 branches YES to a generate operation 2108. The generate operation 2108 generates a termination notification, which notifies the user that the blocked content has terminated. As discussed, the termination notification that is generated in the generate operation 2108, includes any type of notification, such as, but not limited to, an icon, or audible sound.

After the generate operation 2108, another query operation 2110 queries whether the user has entered input in response to the termination notification. In one embodiment, the user input includes clicking somewhere on the display using a mouse input device or the like, to acknowledge the termination notification. In another embodiment, the user input may include a predetermined key sequence using a keyboard, remote control, or the like. In another embodiment, the user input may include a user selection of content to switch to.

If the query operation 2110 determines that there is no user input, the operation flow 2100 branches NO to the generate operation 2108. The generate operation 2108 then continues to generate the termination notification. The generate operation 2108 may be repeated periodically. The generate operation 2108 may, for example, generate an audible tone once every five seconds until the user enters input to acknowledge the tone or select content.

If, on the other hand, the query operation 2110 determines that the user has entered input, the operation flow 2110 branches YES to a discontinue operation 2112. The discontinue operation 2112 discontinues the termination notification. In one embodiment, the discontinue operation 2112 removes any visual termination notification from the display. In another embodiment, the discontinue operation 2112 discontinues any audible tones associated with the termination notification. After the discontinue operation 2112, a present operation 2114 presents content. The present operation 2114 may present user selected content or default content. The operation flow 2100 ends at return operation 2116.

Figure 22:
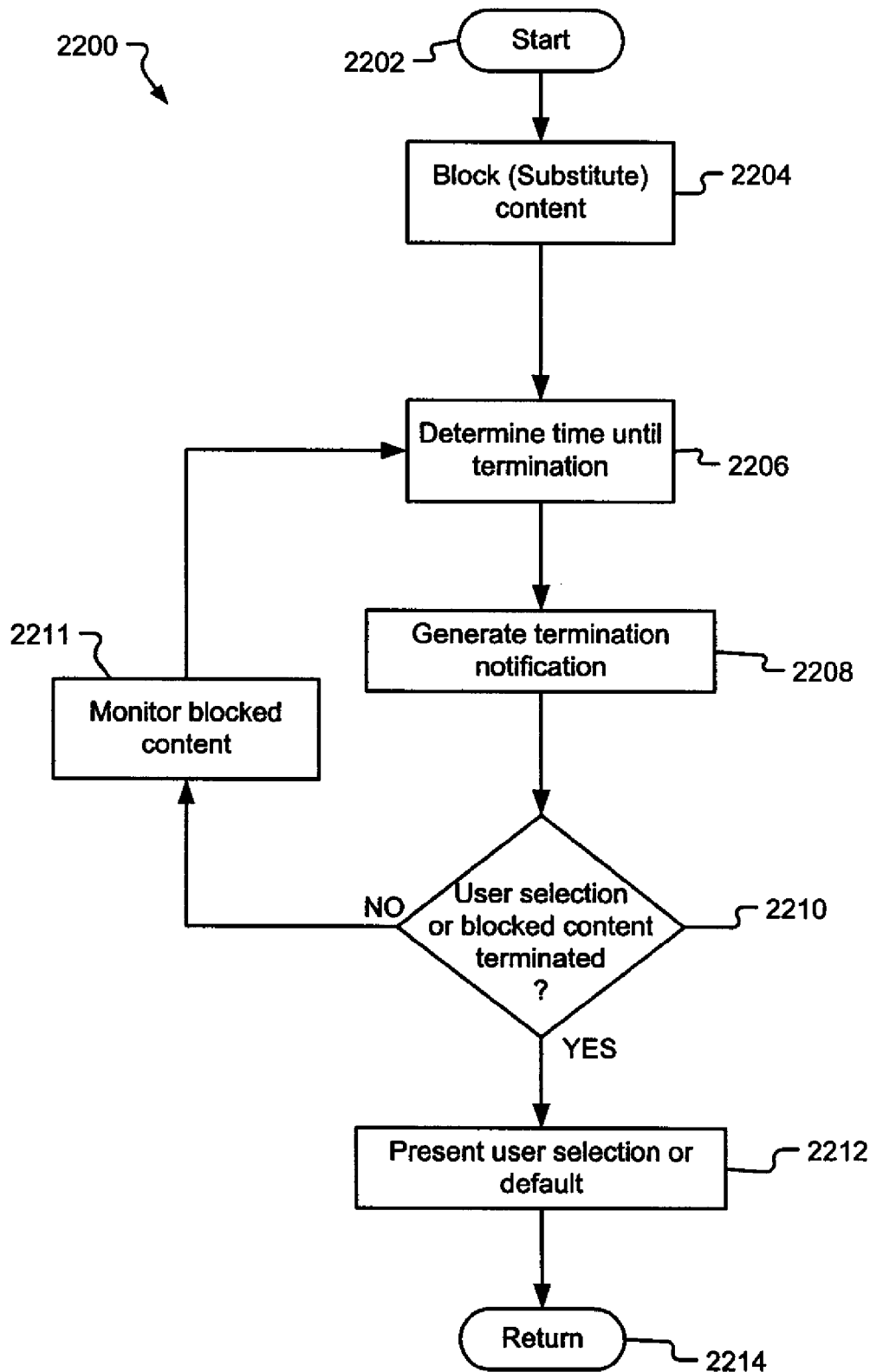
FIG. 22 is an operational flow diagram illustrating exemplary operations for notifying a user of blocked content termination and switching to user-selected content.

An operation flow 2200 is illustrated in FIG. 22, which may be used for termination notification and content selection after blocked content terminates. After a start operation 2202, a block operation 2204 blocks unwanted content from presentation. The block operation 2204 may include substituting alternative content in place of the blocked content as described herein. A determine operation 2206 determines a time when the blocked content will terminate. The determine operation 2206 may involve calculating a time duration associated with the blocked content. The determine operation 2206 may alternatively involve identifying the blocked content as a particular type, such as an advertisement, that has a predetermined length. In one embodiment of the determine operation 2206, the determine operation initializes a counter variable corresponding to the determined time duration.

A generate operation 2208 generates a termination notification. In one embodiment, the termination notification generated in the generate operation 2208, is a visual display element that includes the determined time until termination. A query operation 2210 queries whether a user selection has been made or the blocked content item has terminated. As discussed, a user selection may be a user input that identifies content to be presented after the blocked content terminates. Determining whether the blocked content has terminated in the query operation 2210, may involve determining whether a counter variable such as a counter variable initialized in the determine operation 2206, has reached zero, or another predetermined value.

If the query operation 2210 determines that a user selection has not been made and the blocked content has not terminated, operation 2200 branches NO to a monitor operation 2211. The monitor operation 2211 monitors the blocked content to detect when the blocked content will terminate. Next, the determine operation 2206 determines a time when the blocked content will terminate. If the query operation 2210 determines that a user selection has been made or the blocked content has terminated, the operation flow 2200 branches YES to a present operation 2212. The present operation 2212 presents user selected content or default content. The present operation 2212 presents user selected content if the user selected content in the query operation 2210. Alternatively, the present operation 2212 presents default content if the user did not select content in the blocked content terminated in the query operation 2210. The operation flow 2200 ends at return operation 2214.

The method steps illustrated in FIGS. 7-10, 13-19, and 21-22 may be implemented in firmware in a computer system. Additionally, the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The invention claimed is:

1. A method, comprising:
    determining content, received by a device, is objectionable;
    blocking, by the device, the content from presentation;
    retrieving, by the device, preferred tags associated with a profile;
    retrieving, by the device, an alternative tag associated with alternative content;

comparing, by the device, the preferred tags to the alternative tag;
setting, by the device, an initial value of a score to zero;
incrementing, by the device, the score in response to one of the preferred tags matching the alternative tag;
comparing, by the device, the score to a threshold value;
determining, by the device, that the profile contains no more of the preferred tags to compare to the alternative tag and that the score is less than the threshold value;
retrieving, by the device, another alternate tag associated with another alternative content and comparing the another alternate tag to the preferred tags;
resuming, by the device, incrementing the score in response to the another alternative tag matching any of the preferred tags;
comparing, by the device, the score to the threshold value; and
processing, by the device, the another alternative content for display in substitution of the content.

2. The method according to claim 1, further comprising retrieving a field of the alternative tag.

3. The method according to claim 2, further comprising retrieving the field of a preferred tag of the preferred tags.

4. The method according to claim 3, wherein comparing the preferred tags to the alternative tag comprises comparing the field of the alternative tag to the field of the preferred tag.

5. The method according to claim 1, further comprising replacing the content with the another alternative content in response to the score exceeding the threshold value.

6. The method according to claim 1, further comprising combining the score of both the alternative content and the another alternative content.

7. The method according to claim 1, further comprising incrementing the score when a field of the another alternate tag matches a field of the preferred tag.

8. A system, comprising:
a processor; and
a memory storing code that when executed causes the processor to perform operations, the operations comprising:
receiving objectionable content at a device;
blocking the objectionable content from presentation based on a score;
retrieving preferred tags associated with a profile;
retrieving an alternative tag associated with alternative content;
comparing the preferred tags to the alternative tag;
associating the score with the alternative content;
incrementing the score in response to one of the preferred tags matching the alternative tag;
comparing the score to a threshold value;
determining all of the preferred tags have been compared to the alternative tag and the score is less than the threshold value;
retrieving another alternate tag associated with another alternative content and comparing the another alternate tag to the preferred tags;
resuming incrementing the score in response to the another alternative tag matching any of the preferred tags;
comparing the score to the threshold value; and
processing, based on the score, the another alternative content for display in substitution of the objectionable content.

9. The system according to claim 8, wherein the code further causes the processor to retrieve a field of the alternative tag.

10. The system according to claim 9, wherein the code further causes the processor to retrieve the field of a preferred tag of the preferred tags.

11. The system according to claim 10, wherein the code further causes the processor to compare the field of the alternative tag to the field of the preferred tag.

12. The system according to claim 8, wherein the code further causes the processor to replace the objectionable content with the another alternative content in response to the score exceeding the threshold value.

13. The system according to claim 8, wherein the code further causes the processor to successively compare a field of the another alternate tag to the field of a preferred tag of the preferred tags.

14. The system according to claim 13, wherein the code further causes the processor to increment the score when the field of the another alternate tag matches the field of the preferred tag.

15. The system according to claim 14, wherein the code further causes the processor to combine the score of both the alternative content and the another alternative content.

16. A memory storing instructions that when executed cause a processor to perform operations, the operations comprising:
determining content is objectionable;
retrieving preferred tags associated with a profile;
retrieving an alternative tag associated with alternative content;
comparing the preferred tags to the alternative tag;
associating a score with the alternative content;
incrementing the score in response to one of the preferred tags matching the alternative tag;
comparing the score to a threshold value;
determining all of the preferred tags have been compared to the alternative tag and the score is less than the threshold value;
retrieving another alternate tag associated with another alternative content and comparing the another alternate tag to the preferred tags;
resuming incrementing the score in response to the another alternative tag matching any of the preferred tags;
comparing the score to the threshold value;
determining the score after resumption satisfies the threshold score; and
processing, based on the score, the another alternative content for substitution of the content.

17. The memory according to claim 16, further comprising instructions for retrieving a field of the alternative tag.

18. The memory according to claim 17, further comprising instructions for retrieving the field of a preferred tag of the preferred tags.

19. The memory according to claim 16, further comprising instructions for successively comparing a field of the another alternate tag to the field of a preferred tag of the preferred tags.

20. The memory according to claim 19, further comprising instructions for replacing the objectionable content with the another alternative content in response to the score exceeding the threshold value.

* * * * *